United States Patent [19]
Ishiguro

[11] Patent Number: 5,565,954
[45] Date of Patent: Oct. 15, 1996

[54] RANGE FINDER FOR PASSIVE-TYPE AUTOFOCUSING DEVICE

[75] Inventor: Minoru Ishiguro, Ohmiya, Japan

[73] Assignee: Fuji Photo Optical Co., Ltd., Saitama-ken, Japan

[21] Appl. No.: 238,168

[22] Filed: May 4, 1994

[30] Foreign Application Priority Data

| May 13, 1993 | [JP] | Japan | 5-135328 |
| May 13, 1993 | [JP] | Japan | 5-135329 |
| May 13, 1993 | [JP] | Japan | 5-135330 |
| May 13, 1993 | [JP] | Japan | 5-135331 |

[51] Int. Cl.[6] .............................. G03B 13/36; G01C 3/18
[52] U.S. Cl. ........................... 396/126; 356/3.14; 396/96
[58] Field of Search ................................. 354/402, 406, 354/407, 408, 403; 348/229, 230, 297, 298, 299, 300, 301; 356/3.14

[56] References Cited

U.S. PATENT DOCUMENTS

| 4,373,791 | 2/1983 | Araki | 354/402 |
| 4,387,975 | 6/1983 | Araki | 354/402 |
| 4,575,626 | 3/1986 | Oinoue et al. | 354/407 X |
| 4,616,264 | 10/1986 | Pshtissky | 354/407 X |
| 4,618,235 | 10/1986 | Ishida et al. | 354/403 |
| 4,870,441 | 9/1989 | Yamasaki | 354/402 |
| 5,070,353 | 12/1991 | Komiya et al. | 354/402 |
| 5,189,461 | 2/1993 | Ishiguro | 354/402 |
| 5,257,061 | 10/1993 | Ishiguro | 354/402 |
| 5,264,891 | 11/1993 | Ishiguro | 354/402 |
| 5,274,415 | 12/1993 | Ishiguro | 354/402 |
| 5,298,934 | 3/1994 | Ishiguro | 354/402 |

*Primary Examiner*—W. B. Perkey
*Attorney, Agent, or Firm*—Price, Heneveld, Cooper, DeWitt & Litton

[57] ABSTRACT

Here is disclosed a range finder utilizing a line sensor of charge accumulation type, wherein photosensitive monitoring means is provided to monitor luminance of a scene to be photographed, an appropriate amplification factor is selected on the basis of integral value of charge accumulated by the photosensitive monitoring means, a video signal output from the line sensor and reflecting the luminance of the scene is amplified at the selected amplification factor, then the amplified video signal is computed and thereby a period required for charge accumulation in the line sensor is shorten independently of the scene's luminance. The amplification factor is selected on the basis of the period elapsing before the integral value exceeds a predetermined reference value, or by detecting a particular one of plural reference values that has been reached within the predetermined period or by resetting every time the reference value is reached and by counting the number of times by which the reference value has been reached within the predetermined period so that the relatively low amplification factors may be selected for the scenes of relatively high luminaries and the relatively high amplification factors may be selected for the scenes of relatively low luminaries.

9 Claims, 22 Drawing Sheets

Fig. 21

| | | | |
|---|---|---|---|
| COUNTER3=3 | -1 0 1 2 | 3 4 5 6 | |
| COUNTER3=2 | -2 -1 0 1 | 2 3 4 5 | |
| COUNTER3=1 | -3 -2 -1 0 | 1 2 3 4 | |
| COUNTER3=0 | -4 -3 -2 -1 | 0 1 2 3 | |
| LEFT | -4 -3 -2 -1 | 0 1 2 3 | 4 5 6 7 |
| | L(n-1) | L(n) | L(n+1) |

CENTER  C(n): 0 1 2 3

RIGHT:
| | R(n-2) | R(n-1) | R(n) |
|---|---|---|---|
| | -4 -3 -2 -1 | 0 1 2 3 | 4 5 6 7 |

| | | |
|---|---|---|
| COUNTER3=0 | 0 1 2 3 | 4 5 6 7 |
| COUNTER3=1 | -1 0 1 2 | 3 4 5 6 |
| COUNTER3=2 | -2 -1 0 1 | 2 3 4 5 |
| COUNTER3=3 | -3 -2 -1 0 | 1 2 3 4 |

COUNTER2=0

COUNTER2=1

RANGE FINDER FOR PASSIVE-TYPE AUTOFOCUSING DEVICE

BACKGROUND OF THE INVENTION

1. Technical Field

This invention relates to a range finder for a passive type autofocusing device so arranged that light rays emitted from a scene to be photographed are picked up to find a range to the scene and the objective is adjustably brought into focus based on the result of the range finding.

2. Prior Art

The autofocusing device is used to find a shooting range for a photographic camera or the like in automatic mode and to bring the object into focus based on a result of the range finding and such autofocusing device allows everyone to enjoy photographing easily. Various types of autofocusing devices have already been developed and most of them employ the trigonometrical range finding method. A typical autofocusing device relying on this trigonometrical range finding method is so-called passive-type autofocusing device adapted to pick up light rays emitted from the scene by photosensors provided on the camera and thereby to find a shooting range.

Some of the passive-type autofocusing devices include a pair of photosensors. However, if the scene includes two objects being in contrast with each other, such range finder provided with a pair of photosensors disadvantageously indicates two different states of the single scene to be photographed and consequently cannot achieve a reliable range finding, necessarily resulting in a picture which is out of focus.

To assure a reliable range finding and thereby to obtain a well-focused picture, the applicant of this application has previously proposed a range finding mechanism comprising three photodetector arrays (Japanese Patent Application No. 1989-177382, Japanese Patent Application Disclosure Gazette No. 1991-42642). A principle of range finding by this range finding mechanism will be described in reference with FIGS. 23 and 24 of the attached drawing. The range finding mechanism comprises a reference photosensor 1, a first photosensor 2 and a second photosensor 3. These photosensors 1, 2, 3 comprise, in turn, imaging lenses 1a, 2a, 3a and photodetector arrays 1b, 2b, 3b, respectively, so that a scene to be photographed is imaged through the imaging lenses 1a, 2a, 3a on the photodetector arrays 1b, 2b, 3b, respectively. FIG. 23 illustrates a case in which the scene P comprises a single object. Now, referring to FIG. 23, $X_0$ represents a displacement of an output signal $P_0$ relating to a luminance distribution on the object P detected by the reference photodetector array 1b with respect to an optical axis $T_0$ of the reference photosensor 1, $X_1$ represents a displacement of an output signal $P_1$ relating to a luminance distribution on the object P detected by the first photodetector array 2b with respect to an optical axis $T_1$ of the first photosensor 2, and $X_2$ represents a displacement of an output signal $P_2$ relating to a luminance distribution on the object P detected by the second photodetector array 3b with respect to an optical axis $T_2$ of the second photosensor 3. These displacements $X_0$, $X_1$, $X_2$ represents phase differences relating to the luminance distribution on the object detected by the photodetector arrays 1b, 2b, 3b, respectively. Assume that the optical axes $T_0$, $T_1$, $T_2$ are spaced from one another by distance B, photodetective surfaces of the photodetector arrays 1b, 2b, 3b are spaced from the respective imaging lenses 1a, 2a, 3a by distance A, and the object P lies at a distance Lp from the imaging lenses 1a, 2a, 3a and at a distance X from the optical axis $T_0$, the following equation is derived from the principle of trigonometrical survey:

$$X = x_0 * Lp/A \quad (1)$$

If a direction in which the output signal image appears with respect to the optical axis $T_0$ is taken into account, $$-x_1 = (B-X)/Lp * A \quad (2)$$

$$x_2 = (B+X)/Lp * A \quad (3)$$

If the equation (1) is substituted for these equations (2), (3), respectively, $$x_1 = (B/Lp) * A + x_0 \quad (4)$$

$$x_2 = (B/Lp) * A + x_0 \quad (5)$$

Comparison of the equations (4) and (5) indicates that $x_1$ and $x_2$ are displaced with respect to a reference $x_0$, respectively, by an amount $$(B/Lp) * A = Xp \quad (6)$$

Accordingly, this Xp may be obtained to compute $$Lp = A * B/Xp \quad (7)$$

The procedure used to obtain the Xp will be explained in reference with FIG. 24. FIG. 24(a) illustrates output signals relating to the luminance distribution detected by the photodetector arrays 1b, 2b, 3b expose to light rays emitted from two objects with respect to reference output signals $P_0$, $Q_0$. From the state of FIG. 24(a) to the state of FIG. 24(b), the output signal waveforms $P_1$, $P_2$ may be shifted with respect to the output waveform $P_0$ until these output signal waveforms $P_0$, $P_1$, $P_2$ coincide with one another to obtain an amount of the displacement Xp. More specifically, at this moment of coincidence, $P_1$ and $P_2$ have been displaced by an equal amount. Accordingly, when the three output signal waveforms coincide with one another after the output signal of the photodetector array 2b and the output signal of the photodetector array 3b have been shifted by an equal amount, as seen in FIG. 24(a) the waveforms of these three output signals will provided the data relating to the same object P. Next, as illustrated by FIG. 24(c), the output signal $Q_1$, $Q_2$ may be shifted with respect to the output signal $Q_0$ until the output signal $Q_1$, $Q_2$ coincide with the output signal $Q_0$ to obtain an amount of the displacement Xq.

Based on the Xp, Xq obtained in the manner as has been described above, the ranges Lp, Lq to the objects P, Q, respectively, are computed according to the equation (7).

The range finder for passive type autofocusing device utilizing the principal as has been mentioned above has already been proposed by the applicant of the present patent application (for example, Japanese Patent Application Disclosure Gazette No. 1992-260011, U.S. Pat. No. 5,274,415). With this range finder, the line sensor of charge accumulation type is used as the photosensor, the secondary difference of the luminarice distribution obtained by the line sensor is computed and the zero-cross behaviors of the secondary difference are compared with one another for range finding.

However, used of the charge accumulation type line sensor gives rise to various problems. Specifically, for a scene to be photographed of relatively low luminance, it is inconveniently required to stand by until a sufficient amount of charge is accumulated in the line sensor, so the time required for range finding and therefore for photographing is correspondingly prolonged. For a moving object to be photographed, the optimum shutter chance is available only once and at an instant, so prolongation of the time required for desired amount of charge accumulation may disadvantageously move the object across the resultant picture or the picture being out of focus due to insufficient range finding. Consequently, It is forced to reduce the luminance range of object or scene to be effectively photographed so that the charge accumulation can be completed within a shorter time.

However, reduction of the luminarice range utilized to make a range finding for a scene or object to be photographed reduces the range within which the scene or object can be properly photographed, detracting a versatility of the photographic camera.

Accordingly, it is a principal object of the invention to provide a range finder for passive type autofocusing device allowing the line sensor to accumulate charge in a short time even for the scene or object of a relatively low luminance and allowing a desired range finding to be achieved in a short time even for the scene or object of a relatively wide luminarice range.

SUMMARY OF THE INVENTION

The objective set forth above is achieved, according to one aspect of the invention, by a range finder for a passive type autofocusing device, the range finder comprising three photosensors consisting of a line sensor and adapted to pick up a luminance distribution of a scene to be photographed, a secondary difference computing circuit serving to compute secondary difference of the outputs from those photosensors, a zero-cross detecting circuit adapted to detect a zero-cross point of the output from the secondary difference computing circuit, zero-cross memory circuits adapted to store, in association with those three photosensors, respectively, zero-cross behavior signals obtained by the zero-cross detecting circuit, a coincidence detecting circuit adapted to compare the zero-cross behavior signals stored in those respective zero-cross memory circuits, photosensitive monitoring means used to monitor an average luminance of the scene to photographed, an integrating circuit to integrate the output of the photosensitive monitoring means, a level detecting circuit to detect an integral value provided by the integrating circuit within a predetermined time, and an amplifying circuit adapted to amplify a video signal output from the line sensor at an appropriate amplification factor depending on the integral value of the output from the photosensitive monitoring means that has been detected by the level detecting circuit within the predetermined time, wherein one of those three photosensors is selected as a reference photosensor and the zero-cross behavior signals obtained from the other two photosensors are successively shifted relative to the zero-cross behavior signal obtained from the reference photosensor until a coincidence of these zero-cross behavior signals is detected by said coincidence detecting circuit and a range to the scene is computed from a total amount of such shifting.

Alternatively, a time elapsing before an integral value provided by the integrating circuit reaches a predetermined reference level is detected and a video signal output from the line sensor at an appropriate amplification factor depending on the time elapsing before the integral value of the output from the photosensitive monitoring means reaches the predetermined reference level is amplified by the amplifying circuit in order to find a range to the scene.

In picking up the luminance distribution of the scene by the line sensor, a relatively large integral value detected within a predetermined time indicates a correspondingly high luminance of the scene, so the video signal will be amplified at a relatively low amplification factor and a relatively small integral value indicates a correspondingly low luminance of the scene, so the video signal will be amplified at a relatively high amplification factor.

Alternatively, a relatively short time elapsing before the integral value provided by the integrating circuit reaches the reference level indicates a correspondingly high luminance of the scene, so the amplification will be made at a relatively low amplification factor and, if the time is relatively long, a correspondingly low luminance of the scene is suggested, so the amplification will be made at a relatively high amplification factor. It should be understood that a time taken to detect when the integral value reaches the reference level is preset to a finite value and, if such preset time is exceeded, the amplification will be made at the maximum amplification factor.

The invention also resides in a range finder for passive type autofocusing device, the range finder comprising three photosensors consisting of a line sensor and adapted to pick up a luminance distribution of a scene to be photographed, a secondary difference computing circuit serving to compute secondary difference of the outputs from those photosensors, a zero-cross detecting circuit adapted to detect a zero-cross point of the output from the secondary difference computing circuit, zero-cross memory circuits adapted to store, in association with those three photosensors, respectively, zero-cross behavior signals obtained by the zero-cross detecting circuit, a coincidence detecting circuit adapted to compare the zero-cross behavior signals stored in those respective zero-cross memory circuit, photosensitive monitoring means used to monitor an average luminance of the scene to be photographed, an integrating circuit to integrate the output of the photosensitive monitoring means, a level detecting circuit adapted to select one of a first reference level and a second reference level lower than the first reference level as a detection level and to output a signal indicating completion of charge accumulation in the line sensor when the integral value provided from the integrating circuit reaches the selected detection level, an amplifying circuit having a first amplification factor and a second amplification factor higher than the first amplification factor and adapted to amplify the video signal output from the line sensor selectively at one of these two amplification factors, and a drive control circuit adapted to select one of a combination of first reference level-first amplification factor and a combination of second reference level-second amplification factor, wherein the drive control circuit causes charge accumulation by the line sensor and integration by the integrating circuit first using the first reference level as the detection level for a predetermined period and, upon reception of the completion signal from the level detecting circuit within a predetermined period, terminates charge accumulation, and causes the line sensor to output the video signal, followed by causing this video signal to be amplified at the corresponding amplification factor, wherein if no completion signal is output from the level detecting circuit, the drive control circuit terminates both charge accumulation and integration, then changes the detection signal from the first reference level to the second reference level to cause charge accumulation and integration again and, upon reception of the completion signal as this detection level is reached, terminates charge accumulation and causes the line sensor to output the video signal, followed by causing this video signal to be amplified at the corresponding amplification factor, and wherein one of those three photosensors is selected as a reference photosensor and the zero-cross behavior signals obtained from the other two photosensors are successively shifted relative to the zero-cross behavior signal obtained from the reference photosensor until a coincidence of these zero-cross behavior signals is detected by the coincidence detecting circuit and a range to the scene is computed from a total amount of such shifting.

For the scene of a relatively high luminance, the charge accumulation in the line sensor during pick-up of the luminance distribution may be completed within the predetermined period by using the first reference level as the detection level. Then, the drive control circuit selects the first amplification factor at which the video signal output from the line sensor is amplified for detection of the zero-cross behavior.

If the scene is of a relatively low and the charge accumulation is not completed within the predetermined period so long as the first reference level is used as the detection level, the second reference level lower than the first reference level is selected as the detection level so that the charge accumulation may be completed when this detection level is reached. The video signal output from the line sensor is amplified by the amplifying circuit at the second amplification factor for detection the zero-cross behavior.

The invention resides also in a range finder for passive type autofocusing device, the range finder comprising three photosensors consisting of a line sensor and adapted to pick up a luminance distribution of a scene to be photographed, a secondary difference computing circuit serving to compute secondary difference of the outputs from those photosensors, a zero-cross detecting circuit adapted to detect a zero-cross point of the output from the secondary difference computing circuit, zero-cross memory circuits adapted to store, in association with those three photosensors, respectively, zero-cross behavior signals obtained by the zero-cross detecting circuit, a coincidence detecting circuit adapted to compare the zero-cross behavior signals stored in the respective zero-cross memory circuits, photosensitive monitoring means used to monitor an average luminance of the scene to be photographed, an integrating circuit to integrate the output of the photosensitive monitoring means, a level detecting circuit having a detection level to be compared with an integral value provided from the integrating circuit and adapted to output a detection signal when the integral value reaches the detection level, an amplifying circuit adapted to amplify the video signal output from the line sensor selectively at a plurality of amplification factors, and a drive control circuit adapted to drive the amplifying circuit at an appropriate amplification factor selected from the plurality of amplification factors, wherein there are provided same number of detection levels as the number of amplification factors and the detection levels are associated with the amplification factors so that the lower detection levels be associated with the correspondingly higher amplification factors or the higher detection levels be associated with the correspondingly lower amplification factors, wherein, upon each reception of the detection signal output from the level detecting circuit within a predetermined period, the drive control circuit supplies the level detecting circuit with the detection level successively selected in the order from the lower to the higher, wherein, upon reception of the detection signal for the highest detection level output from the level detecting circuit within a predetermined period or the first detection signal output therefrom after the predetermined period has elapsed, the drive control circuit terminates charge accumulation in the line sensor, causes the line sensor to output a video signal and causes the amplifying circuit to amplify the video signal at the amplification factor corresponding to the detection level at the moment of completion of charge accumulation, and wherein one of those three photosensors is selected as a reference photosensor and the zero-cross behavior signals obtained from the other two photosensors are successively shifted relative to the zero-cross behavior signal obtained from the reference photosensor until a coincidence of these zero-cross behavior signals is detected by the coincidence detecting circuit a range to the scene is computed from a total amount of such shifting.

Preferably, there is further provided, in order that the drive control circuit may reliably operate with the single level detecting circuit, a reference level generating circuit adapted to, upon reception of output signal from the drive control circuit, supply the level detecting circuit with a detection level to be compared with the integral value.

The invention resides, according to one aspect thereof, in a range finder for passive type autofocusing device, the range finder comprising three photosensors consisting of a line sensor and adapted to pick up a luminance distribution of a scene to be photographed, a secondary difference computing circuit serving to compute secondary difference of the outputs from those photosensors, a zero-cross detecting circuit adapted to detect a zero-cross point of the output from the secondary difference computing circuit, zero-cross memory circuits adapted to store, in association with those three photosensors, respectively, zero-cross behavior signals obtained from the zero-cross detecting circuit, a coincidence detecting circuit adapted to compare the zero-cross behavior signals stored in these respective zero-cross memory circuits, photosensitive monitoring means used to monitor an average luminance of the scene to be photographed, an integrating circuit to integrate the output of the photosensitive monitoring means, a plurality of level detecting circuits having different detection levels, respectively, to be compared with the integral value applied thereto from the integrating circuit and adapted to output detection signals, respectively, when the integral value reaches the respective detection levels, an amplifying circuit adapted to amplify the video signal output from the line sensor selectively at a plurality of amplification factors, and a drive control circuit adapted to drive the amplifying circuit at an appropriate amplification factor selected from the plurality of amplification factors, wherein the detection levels of the respective level detecting circuits are associated with the plurality of amplification factors so that the lower formers be associated with the correspondingly higher latters or the higher formers be associated with the correspondingly lower latters, wherein, upon each reception of the detection signal output from each level detecting circuit within a predetermined period, the drive control circuit selects the detection levels successively in the order from the lower to the higher, wherein, upon reception of the detection signal for the highest detection level output from the corresponding level detecting circuits within a predetermined period or the first detection signal output from one of the level detecting circuits after the predetermined period has elapsed, the drive control circuit terminates charge accumulation in the line sensor, causes the line sensor to output a video signal and causes the amplifying circuit to amplify the video signal at the amplification factor corresponding to the detection level at the moment of completion of charge accumulation, and wherein one of those three photosensors is selected as a reference photosensor and the zero-cross behavior signals obtained from the other two photosensors are successively shifted relative to the zero-cross behavior signal obtained from the reference photosensor until a coincidence of these zero-cross behavior signals is detected by the coincidence detecting circuit and a range to the scene is computed from a total amount of such shifting.

For the scene of a relatively high luminance, the integral value reaches the maximum detection level within or after the predetermined period as the line sensor picks up a luminance distribution of this scene, and thereupon the detection signal corresponding to the maximum detection level is output from the level detecting circuit. Then, the drive control circuit selects the minimum amplification factor at which the amplifying circuit amplifies the video signal output from the line sensor.

For the scene of a relatively low luminance, the integral value reaches the minimum detection level after the predetermined period has elapsed and the corresponding detection signal is output from the level detecting circuit. In such case, the drive control circuit selects the maximum amplification factor at which the video signal output from the line sensor is amplified by the amplifying circuit.

Intermediate amplification factors are selected in association with intermediate detecting levels, respectively, so, even if the luminance of the scene varies, the video signal having its signal level maintained substantially constant can be output from the amplifying circuit by appropriately altering the amplification factor and thus the signal of practically constant level is available for detection of the zero-cross behavior.

The invention resides, in accordance with another aspect, in a range finder for passive type autofocusing device, the range finder comprising three photosensors consisting of a line sensor and adapted to pick up a luminance distribution of a scene to be photographed, a secondary difference computing circuit serving to compute secondary difference of the outputs from those photosensors, a zero-cross detecting circuit adapted to detect a zero-cross point of the output from the secondary difference computing circuit, zero-cross memory circuits adapted to store, in association with those three photosensors, respectively, zero-cross behavior signals obtained by the zero-cross detecting circuit, a coincidence detecting circuit adapted to compare the zero-cross behavior signals stored in those respective zero-cross memory circuits, photosensitive monitoring means used to monitor an average luminance of the scene to be photographed, an integrating circuit to integrate the output of the photosensitive monitoring means, a level detecting circuit adapted to output a detection signal when an integral value provided by the integrating circuit reaches a preset detection level, an amplifying circuit selectively using a plurality of amplification factors G/M (G represents the highest amplification factor and M represents positive integers) and adapted to amplify a video signal output from the line sensor at the one selected from the amplification factors G/M, and a drive control circuit used to control charge accumulation in the line sensor, resetting of the integrating circuit and setting of the amplification factor G/M for the amplifying circuit, wherein, if the amplification factor preset for the amplifying circuit is G/M, the drive control circuit keeps the integrating circuit reset until the drive control circuit is applied with the Mth detection signal output from the level detecting circuit, terminates charge accumulation in the line sensor upon reception of the Mth detection signal and triggers amplification at the preset amplification factor, and wherein one of those three photosensors is selected as a reference photosensor and the zero-cross behavior signals obtained from the other two photosensors are successively shifted relative to the zero-cross behavior signal obtained from the reference photosensor until a coincidence of these zero-cross behavior signals is detected by the coincidence detecting circuit and a range to the scene is computed from a total amount of such shifting.

Specifically, a relatively lower amplification factor, for example, G/4 is set for scene of a relatively high luminance during pick-up of this scene's luminance distribution by the line sensor and the integrating circuit is kept reset until the fourth detection signal is output from the level detecting circuit. Upon reception of this fourth detection signal, the drive control circuit terminates charge accumulation in the line sensor and the video signal output from the line sensor is amplified at the above-mentioned amplification factor for detection of the zero-cross behavior.

For the scene of a relatively low luminance, a relatively high amplification factor, for example, G/2 is set and the integrating circuit is kept reset until the second detection signal is output from the level detecting circuit. Upon reception of this second detection signal, the drive control circuit terminates charge accumulation in the line sensor and the video signal output from the line sensor is amplified at the above-mentioned amplification factor for detection of the zero-cross behavior.

Duration of each detection signal output for the scene of a relatively high luminance is shorter than that of each detection signal output for the scene of a relatively low luminance, so a predetermined number of detection signals are output within a relatively short period although the number of these detection signals is relatively many. On the other hand, duration of each detection signal output for the scene of relatively low luminance is longer than the of each detection signal output for the scene of a relatively high luminance, but the period within which a predetermined number of detection signals are output is shortened because the number of these detection signals is relatively few. The video signal output from the line sensor is amplified at a relatively high amplification factor G/2 for the scene of a relatively high luminance and at a relatively low amplification factor G/4 for the scene or a relatively low luminance, so the video signal amplified so as to have a practically constant signal level is available for detection of the zero-cross behavior independently of the scene's luminance.

According to still another aspect, the invention resides in a range finder for passive type autofocusing device, the range finder comprising three photosensors consisting of a line sensor and adapted to pick up a luminance distribution of a scene to be photographed, a secondary difference computing circuit serving to compute secondary difference of the outputs from those photosensors, a zero-cross detecting circuit adapted to detect a zero-cross point of the output from the secondary difference computing circuit, zero-cross memory circuits adapted to store, in association with those three photosensors, respectively, zero-cross behavior signals obtained by the zero-cross detecting circuit, a coincidence detecting circuit adapted to compare the zero-cross behavior signals stored in those respective zero-cross memory circuits, photosensitive monitoring means used to monitor an average luminance of the scene to be photographed, an integrating circuit to integrate the output of the photosensitive monitoring means, a level detecting circuit adapted to output a detection signal when an integral value provided by the integrating circuit reaches a preset detection level, an amplifying circuit adapted to amplify a video signal output from the line sensor at an appropriate one selected from a plurality of amplification factors, a drive control circuit used to control charge accumulation in the line sensor, resetting of the integrating circuit and setting of the amplification factor for the amplifying circuit, wherein charge accumulation occurs in the line sensor for a predetermined period and, if the number of detection signals output from the level detecting circuit with this predetermined period is M, an amplification factor which is lower than 1/M of the highest amplification factor in the amplifying circuit but nearest to 1/M is set for the amplifying circuit so that the output signal of the line sensor is amplified at this amplification factor, and wherein one of these three photosensors is selected as a reference photosensor and the zero-cross behavior signals obtained from the other two photosensors are successively shifted relative to the zero-cross behavior signal obtained from the reference photosensor until a coincidence of these zero-cross behavior signals is detected by the coincidence detecting circuit and a range to the scene is computed from a total amount of such shifting.

Pick-up of scene's luminance, namely, charge accumulation by the line sensor is completed within a predetermined period and the video signal output from the line sensor is amplified at the amplification factor corresponding to the number of detection signals (i.e., the number of pulses) output within the predetermined period, for detection of the zero-cross behavior.

For the scene of relatively high luminance, the integral value exceeds the above-mentioned detection level within a relatively short period during pick-up of scene's luminance distribution by the line sensor, so the number of pulses M, output from the level detecting circuit within a predetermined period and the maximum amplification factor $1/M_1$ corresponding to the number of pulses $M_1$ is set. For the scene of a relatively low luminance, on the other hand, a period elapsing before the integral value exceeds the detection level is longer than for the scene of higher luminance and the number of pulses $M_2$ output within the predetermined period is fewer than for the scene of higher luminance and the amplification factor $1/M_2$ is set of the maximum amplification factor is set. A relationship $M_1 > M_2$ is given for the number of circuit M and therefore $1/M_1 < 1/M_2$. Thus, the video signal output from the line sensor is amplified at a lower amplification factor for the scene of a relatively high luminance and at a higher amplification factor for the scene of a relatively low luminance. Consequently, the charge accumulation in the line sensor is completed within the predetermined period independently of the scene's luminance and the video signal is amplified at amplification factor depending on the luminance of the scene to be photographed so that the video signal of a practically constant level be available for detection of the zero-cross behavior. It should be understood that an amplification factor less than a product of the maximum amplification factor for the amplifying circuit and the number of pulses M and having a value nearest to this product is selected.

The line sensor forming those three photosensors provides the output voltage depending on a luminance distribution of the scene to be photographed and secondary difference distribution of this output voltage behaves across the zero-cross level. The zero-cross points of such behavior obtained by those three photosensors from the luminance distribution of the same portion in the scene are detected to be shifted relative to a predetermined respective zero-cross behavior. An amount of such shifting is detected by the coincidence detecting circuit and, based on the amount of shifting, a range to the scene can be computed by trigometric technique.

These and other features, objects and advantage of the present invention will become apparent upon reading the following description thereof together with reference to the accompanying drawings, in which:

BRIEF DESCRIPTION OF THE DRAWINGS

FIG. 21, is a conceptional diagram illustrating the procedure to detect a coincidence of the data stored in the zero-cross memory circuits;

DETAILED DESCRIPTION OF THE INVENTION

The range finder for autofocusing device of the inventor will be described by way of example more specifically in reference to the attached drawings.

Embodiment 1

Embodiment 1 will be described in reference with FIGS. 1, 2 and FIGS. 9 through 22.

Figure 10:
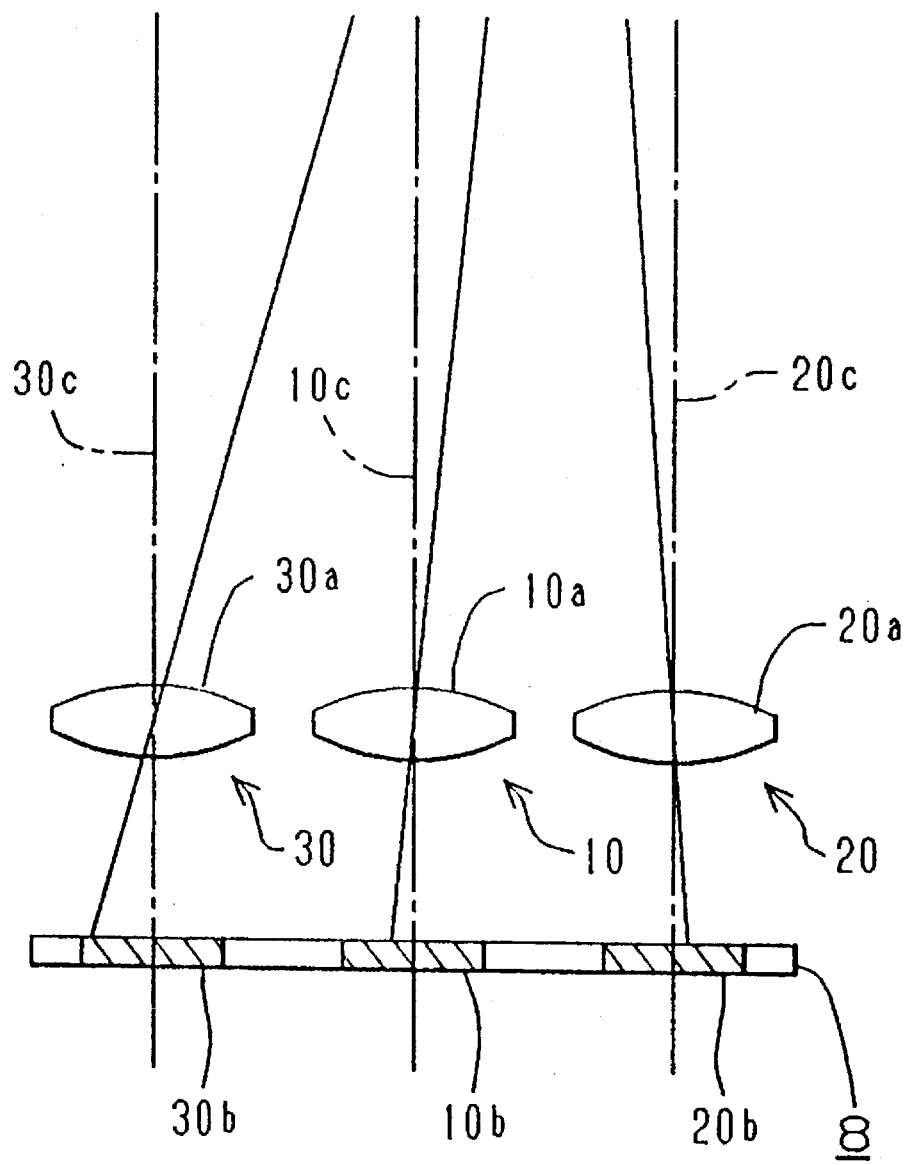
FIG. 10 is a side view schematically showing the arrangement of the photosensors.

Referring to FIG. 10, photosensors 10, 20, 30 comprise a single line sensor which comprises, in turn, a photodetector array composed from an appropriate number of pixels arranged side by side, and three imaging lenses combined with the line sensor. There are provided on the front side of the photographic camera those three imaging lenses 10a, 20a, 30a so that light rays emitted from a scene to be photographed pass through these lenses 10a, 20a, and the scene is imaged on respective portions of the single line sensor 8 placed behind the respective imaging lenses 10a, 20a, 30a. The line sensor 8 is actually divided into three sections, i.e., a central line sensor section 10b, a right side line sensor section 20b and a left side line sensor section 30b. Correspondingly, photosensors 10, 20, 30 are designated herein as the central sensor 10, the right side sensor 20 and the left side sensor 30 with optical axes 20c, 30c of the right side sensor 20 and the left side sensor 30, respectively, being arranged symmetrically with respect to an optical axis 10c of the central sensor 10.

Figure 9:
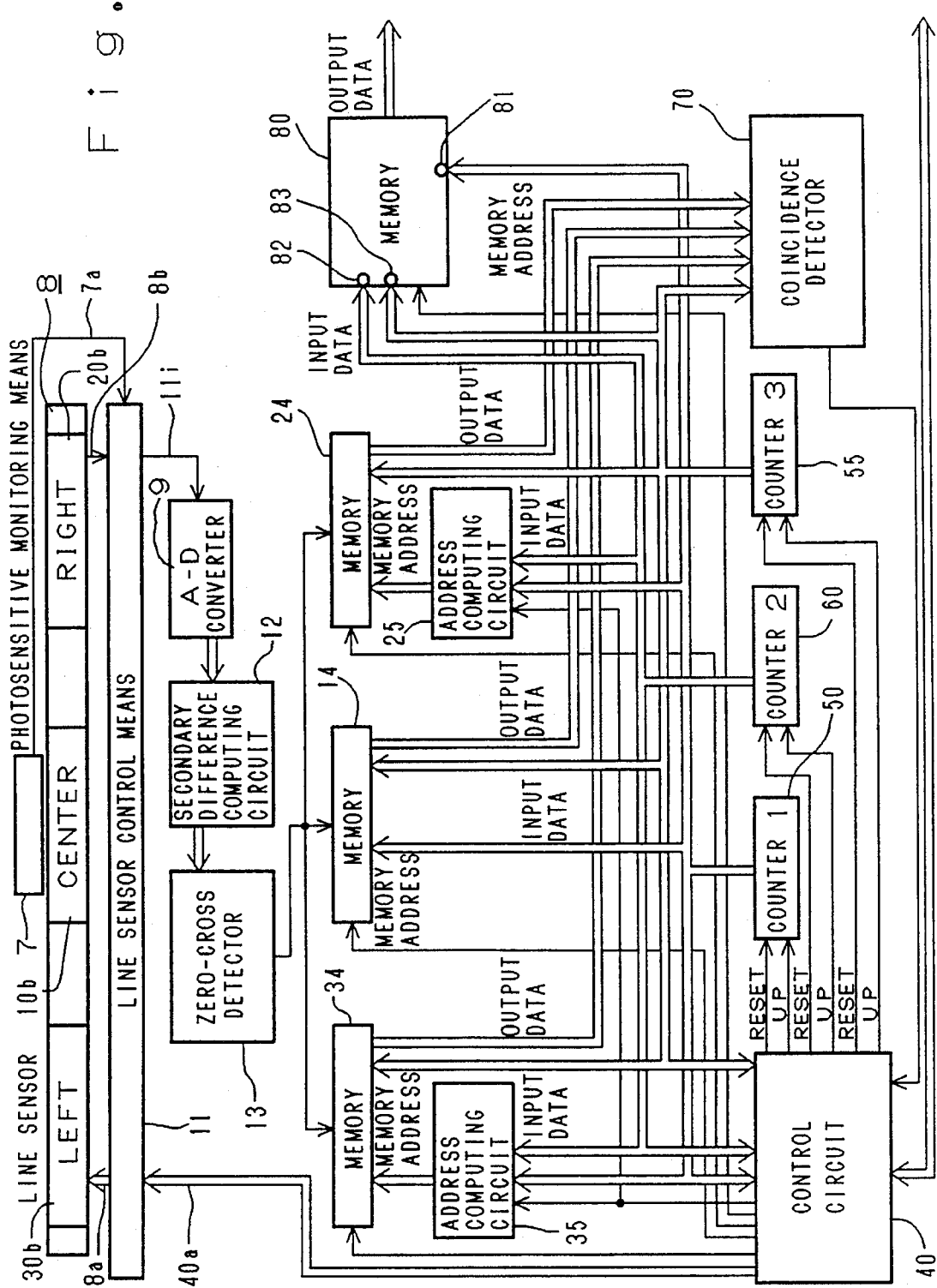
FIG. 9 is a circuit block diagram showing the range finder for passive type autofocusing device of the invention.

Referring to FIG. 9, the line sensor 8 is applied with a control signal from line sensor control means 11 electrically connected via drive control signal line 40a to a control circuit 40 so that the line sensor control means 11 is controlled by a drive control signal output from the control circuit 40.

Figure 1:
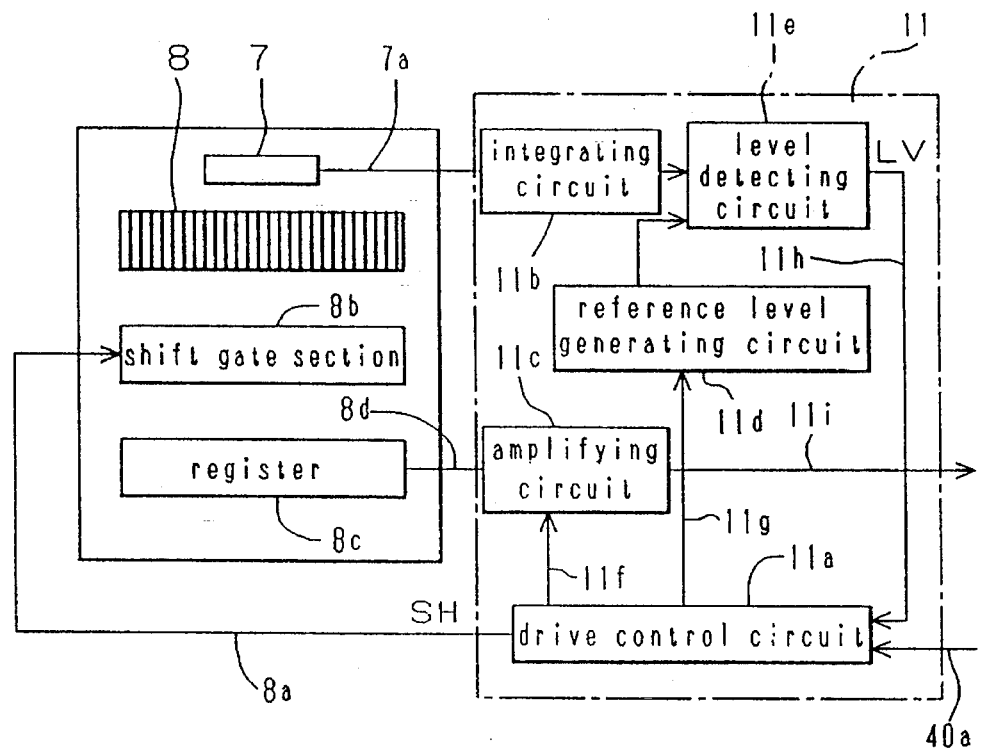
FIG. 1 is a block diagram illustrating first and second embodiments of line sensor control means used to control charge accumulation as well as transfer of accumulated charge occurring in the line sensor of the range finder for passive type autofocusing device constructed in accordance with the invention.

Referring to FIG. 1, the line sensor control means 11 comprises a drive control circuit 11a, an integrating circuit 11b, an amplifying circuit 11c, a reference level generating circuit 11d and a level detecting circuit 11e so that the drive control signal is applied from the control circuit 40 to the drive control circuit 11a. A sensor drive signal output from the drive control circuit 11a is applied via signal line 8a to a shift gate section 8b serving to change-over operation of the line sensor 8. More specifically, the shift gate section 8b is respective to the sensor drive signal to initiate or terminate pick-up of scene's luminance by the line sensor 8 and to be opened so that the luminance data of the scene accumulated in the line sensor 8 be transferred to a register 8c. Amplification factor selecting signal and reference level selecting signal both output from the drive control circuit 11a are applied via amplification factor selecting signal line 11f and reference level selecting signal line 11g, respectively, to the amplifying circuit 11c and the reference level generating circuit 11d, respectively. Output of the reference level generating circuit 11d is applied to the level detecting circuit 11e and a reference level selected by the reference level generating circuit 11d is set as a detection level for the level detecting circuit 11e. Detection signal LV output from the level detecting circuit 11e is applied via detection signal line 11h to the drive control circuit 11a. Output signal of the register 8c is applied via signal line 8d to the amplifying circuit 11c.

There is provided, on the front side of camera at a position exposed to light rays coming from a scene to be photographed, photosensitive monitoring means 7 adapted to monitor an average luminance of the scene and output of this means 7 is applied via monitor signal line 7a to the integrating circuit 11b. Output of this integrating circuit 11b is applied to the level detecting circuit 11e so that an integral value provided by the integrating circuit 11b is compared with the detection level held by the level detecting circuit 11e.

Figure 2:
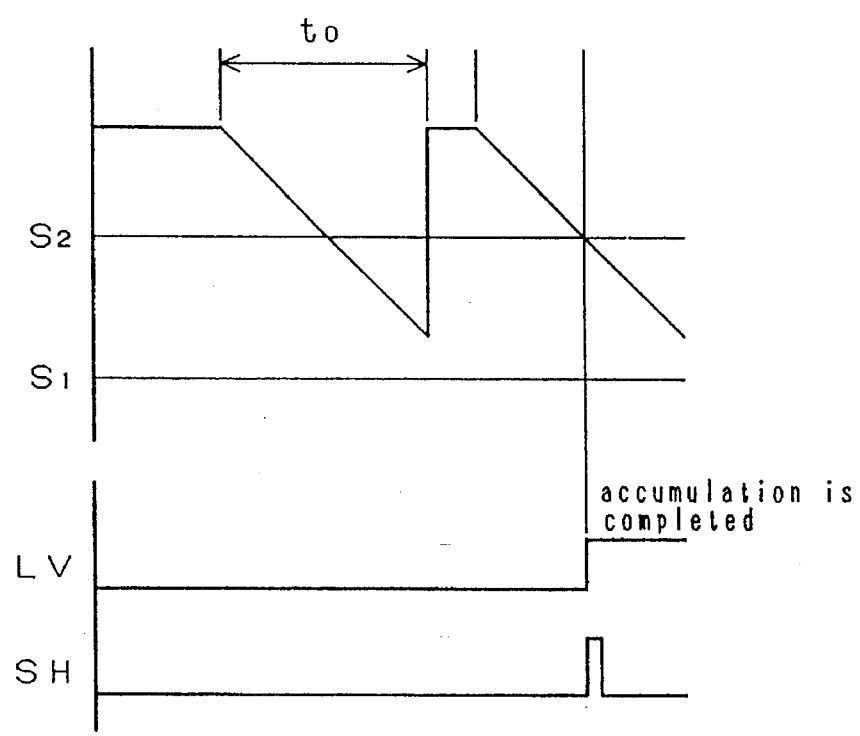
FIG. 2 is a time chart showing the manner in which the first embodiment of line sensor control means operates until charge accumulation in the line sensor is completed.

Referring to FIG. 2, a first reference level $S_1$ and a second reference level $S_2$ lower than the first reference level $S_1$ are set for the reference level generating circuit 11d and one of these reference levels $S_1$, $S_2$ is applied to the level detecting circuit 11e depending on the reference level selecting signal applied from the drive control circuit 11a to the reference level generating circuit 11d. For the amplifying circuit 11c, a first amplification factor $G_1$ and second amplification factor $G_2$ higher that the first amplification factor $G_1$ are set and the signal output from the line sensor 8 is amplified at one of these two amplification factors $G_1$, $G_2$ depending on the amplification factor selecting signal applied from the drive control circuit 11a to the amplifying circuit 11c. Specifically, the drive control circuit 11a controls the amplifying circuit 11c to select the first amplification factor $G_1$ when the first reference level $S_1$ is selected and to select the second amplification factor $G_2$ when the second reference level $S_2$ is selected. The drive control circuit 11a is adapted to output, in the first place, the reference level selecting signal for the first reference level $S_1$ and, if the detection signal LV is not output from the level detecting circuit 11e even after a predetermined period $t_0$ has elapsed, output the reference level selecting signal with which the reference level is changed over from the first reference level $S_1$ to the second reference level $S_2$. Upon reception of the detection signal LV from the level detecting circuit 11e, the drive control circuit 11a outputs a transfer signal SH, one of sensor drive signals, to the line sensor 8. Upon reception of this transfer signal SH, the shift gate section 8b is opened so that the luminance data of the scene which has been picked up by the line sensor 8 is transferred to the register 8c and then applied from this register 8c to the amplifying circuit 11c.

Figure 11:
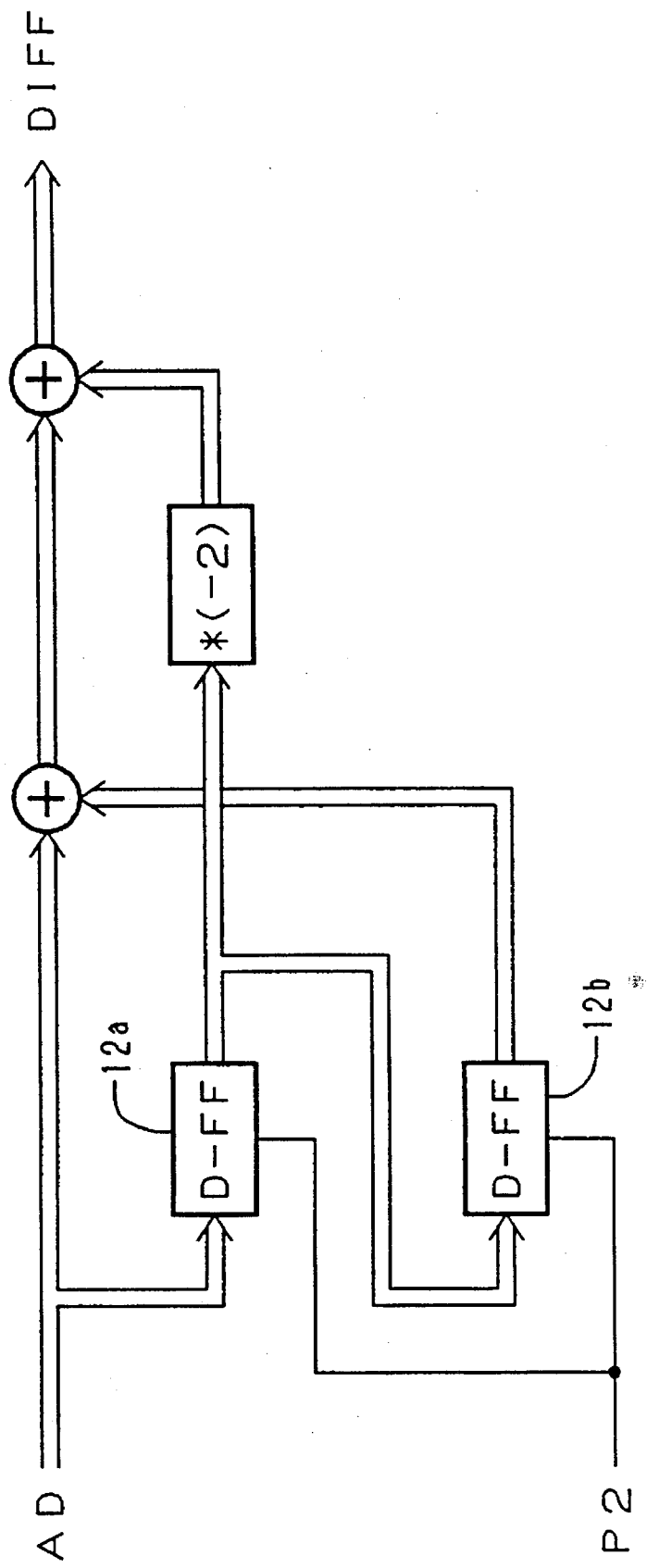
FIG. 11 is a circuit block diagram of the secondary difference computing circuit used to A/D convert the output of the line sensor and to compute the secondary difference thereof by digitally processing the converted output.
Figure 12:
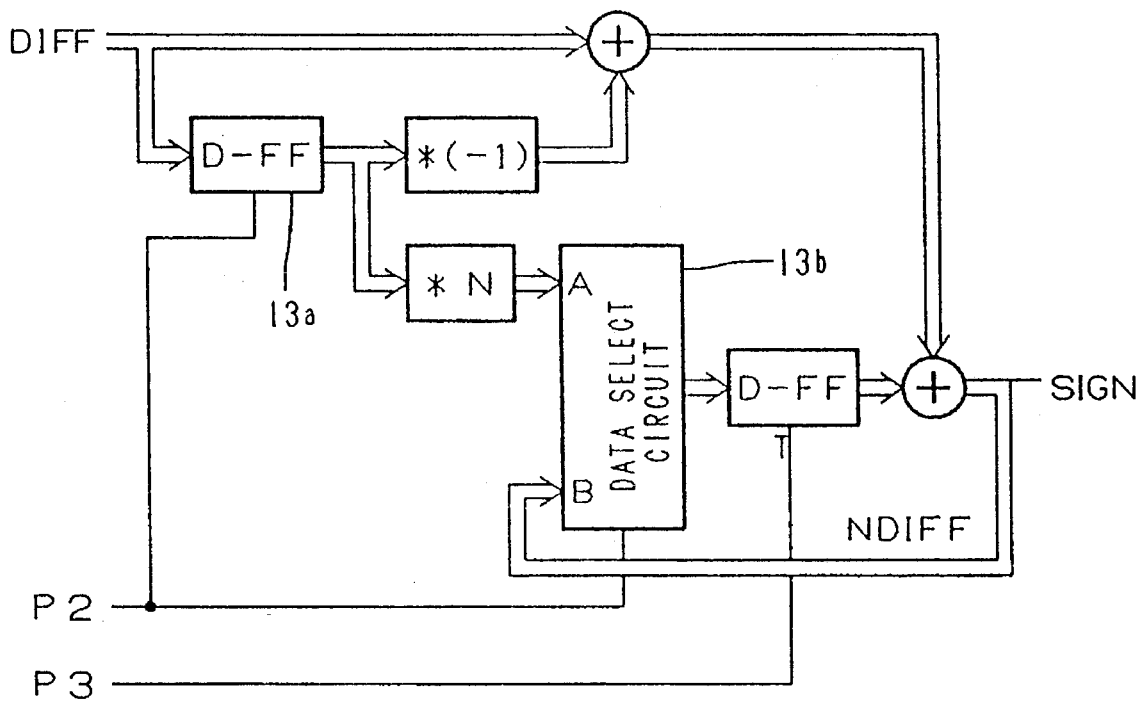
FIG. 12 is a block diagram of the interpolating circuit used to interpolate the output signal of the secondary difference computing circuit by digitally processing and linearly approximating the output signal.

Output of the amplifying circuit 11c is applied via video signal line 11i to an A/D converter 9, as shown by FIG. 9. As will be apparent from FIG. 14, the A/D converter 9 A/D converts the output signal of the line sensor 8 in synchronization with a clock pulse P1. A secondary difference computing circuit 12 is connected to the output side of the A/D converter 9 and computes a secondary difference of the scene's luminance distribution obtained by the line sensor 8. Referring to FIG. 11, the secondary difference computing circuit 12 successively stores output signals AD of the A/D converter 9 into memory circuits 12a, 12b utilizing a D flip-flop in synchronization with a clock pulse P2 and determines the secondary difference by computing $$DIFF(n)=AD(n-2)-2*AD(n-1)+AD(n) \quad (8)$$

As will be apparent from FIG. 9, the output signal DIFF of the secondary difference computing circuit 12 is applied to a zero-cross detecting circuit 13 which functions to detect a zero-cross point of the secondary difference having been obtained by the secondary difference computing circuit 12. In the zero-cross detecting circuit 13, an interpolating circuit shown in detail in FIG. 12 interpolates the secondary difference signal DIFF. More specifically, this interpolating circuit initiates its function by storing the secondary difference signal DIFF into a memory circuit 13a utilizing a D flip-flop, then multiplies the value thus stored by (−1) and N. The N-multiplied value is applied to a data selecting circuit 13b. The sum of the (−1)-multiplied value and the secondary difference signal DIFF is added to the output data from the data selecting circuit 13b. The data obtained by this addition is fed back to the data selecting circuit 13b. In other words, the interpolating circuit interpolates the secondary difference signal DIFF by computing, in synchronization with a clock pulse P3, $$NDIFF(m)=N*DIFF(n-1)+m*(DIFF(n)-DIFF(n-1)) \quad (9)$$

and thereby linearly approximating the signal DIFF. Simultaneously with such interpolation, the interpolating circuit outputs a sign signal SIGN indicating whether the data has a positive sign or a negative sign.

Figure 13:
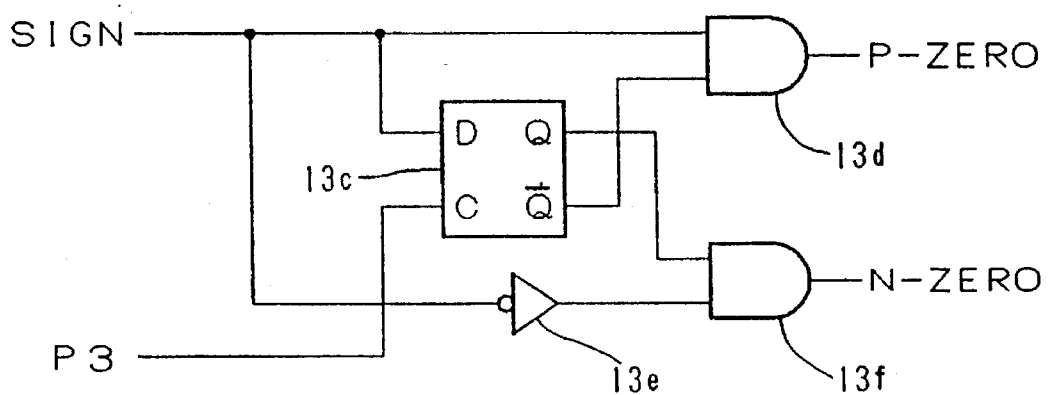
FIG. 13 is a circuit diagram of the zero-cross detecting circuit used to detect the zero-cross point in the interpolated data of the secondary difference signal provided from the secondary difference computing circuit.

Referring to FIG. 13, the zero-cross detecting circuit 13 includes a D flip-flop 13c to which the sign output signal. SIGN is applied. The $\overline{Q}$ terminal off the D flip-flop 13c is applied together with the sign signal SIGN to an AND gate 13d while the Q terminal of the D flip-flop 13c is applied together with the sign output signal SIGN, inverted by an inverter 13e, to another AND gatt 13f.

. Output signal Vin from the line sensor 8 is applied to the A/D converter 9 in which the signal Vin is A/D converted to provide the output signal AD as illustrated by the time chart of FIG. 14. Upon application of this output signal AD to the secondary difference computing circuit 12, the secondary difference signal DIFF is generated in synchronization with the clock pulse P2 and, upon application of this signal DIFF to the zero-cross detecting circuit 13, the signal DIFF is linearly approximated to provide an interpolated signal NDIFF/N and sign signal SIGN. The zero-cross detecting circuit 13 is responsive to this sign signal SIGN so that, in synchronization with the clock pulse P3, the AND gate 13d outputs the zero-cross signal in the form of a pulse P-ZERO which rises as the sign signal SIGN changes from L to H and the AND gate 13f outputs the zero-cross signal in the form of a pulse N-ZERO which rises as the sign signal SIGN changes from H to L. In other words, the pulse P-ZERO rises as the interpolated data NDIFF/N derived from the secondary difference signal DIFF zero-crosses from the positive side to the negative side and the pulse N-ZERO rises as the interpolated data NDIFF/N zero-crosses from the negative side to the positive side.

Zero-cross behavior signal obtained by the zero-cross detecting circuit 13 is divided into portions corresponding to the central line sensor section 10b, the right side line sensor section 20b and the left side line sensor section 30b, respectively, which are separately applied to and stored in zero-cross memory circuits 14, 24, 34, respectively, For the right and left side sections of the line sensor 8, the corresponding portions of the zero-cross behavior signal are stored at addresses provided from respective address computing circuits 25, 35 according to the pixel locations in the respective line sensor sections and, for the central section 10b of the line sensor 8, the corresponding portions of the zero-cross behavior signal is stored at an address according to a count signal (COUNTER 1) of a first counter 50. Specifically, the count signals (COUNTER 1) are applied from the first counter 50 to the address computing circuits 25, 35 as well as to the central memory circuit 14 for successive incrementing. The respective portions of the zero-cross behavior signal are stored at the respective addresses corresponding to the respective pixels in accordance with the following equations:

$$ADDRESS=COUNTER\ 1 \quad (10)$$

for the central memory circuit 14, $$ADDRESS=COUNTER\ 1 \quad (11)$$

for the right side memory circuit 24, and $$ADDRESS=COUNTER\ 1 \quad (12)$$

for the left side memory circuit 34.

Count signals (COUNTER 2) are applied from a second counter 60 to the address computing circuits 25, 35. Count up and reset of the second counter 60 and the first counter 50 are under control of the output signal from the control circuit 40. The second counter 60 increments the address for every read-out of data from the zero-cross memory circuits 24, 34 as will be described later. The address computing circuits 25, 35 are supplied from the control circuit 40 with address processing information on the basis of which the address computing circuits 25, 35 provide predetermined write/read signals into and from the zero-cross memory circuits 25, 35.

Figure 14:
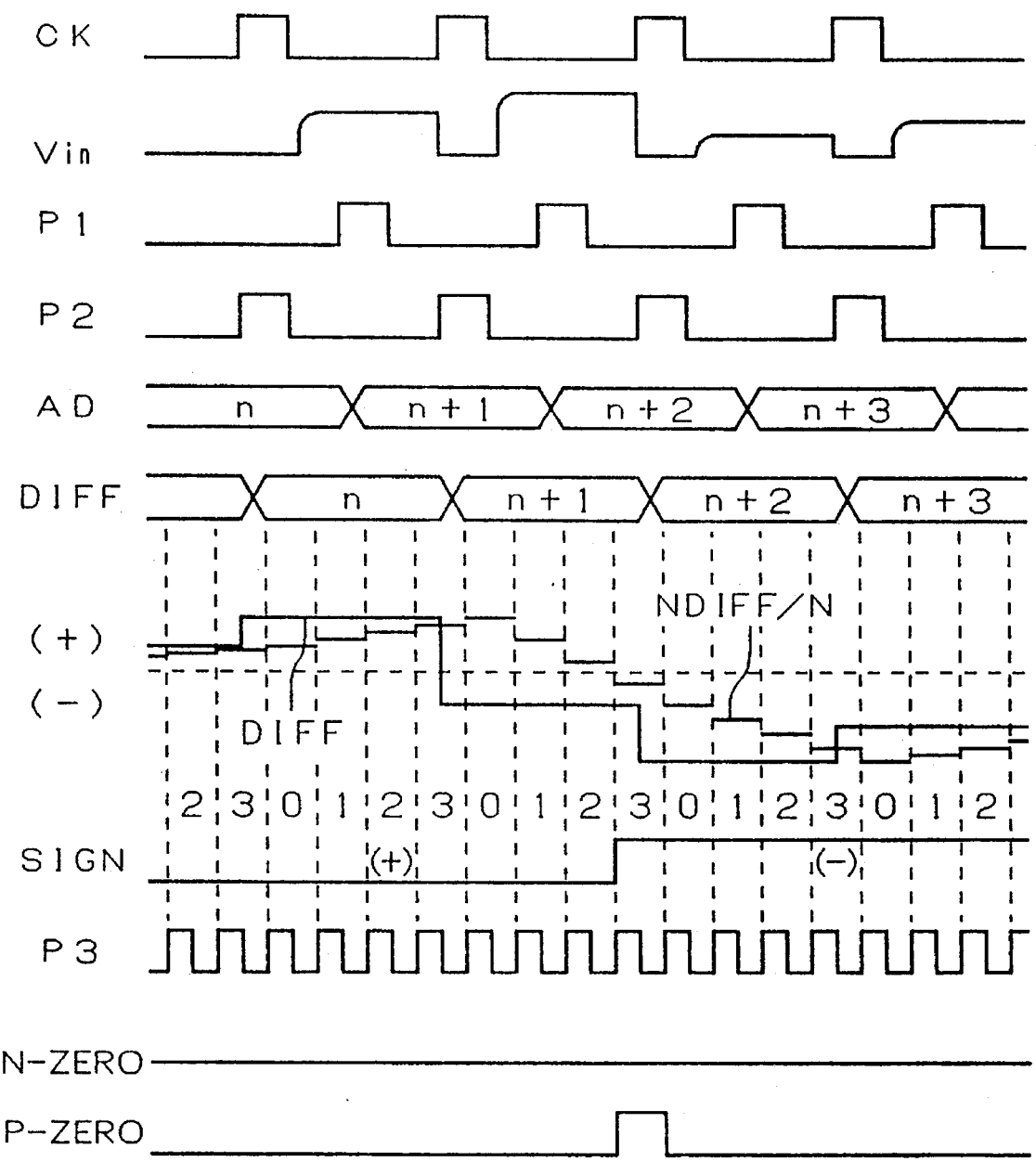
FIG. 14 is a time chart for the output signals of the line sensor, the A/D converter, the secondary difference computing circuit and the zero-cross detecting circuit, respectively.

The respective zero-cross memory circuits 14, 24, 34 are applied with interpolated location count signals (COUNTER 3) from an interpolated location counter 55 adapted to be counted up or reset depending on the output signal from the control circuit 40. As shown by FIG. 14, the interpolated location counter 55 operates in synchronization with the clock pulse P3 having a period shorter than both the clock pulse P1 and the clock pulse P2 and additionally operates also in synchronization with the pulse P3 to divide the secondary difference signal DIFF into four portions having respective location codes 0 through 3 assigned thereto. According to the number of interpolations (4 in this case), the interpolated location count signals (COUNTER 3) are applied from the interpolated location counter 55 to the zero-cross memory circuits 14, 24, 34 and, in synchronization with the interpolated location count signals (COUNTER 3), location codes representing zero-cross points detected by the zero-cross detecting circuit 13 are stored in the zero-cross memory circuits 14, 24, 34, for the above-mentioned respective location, codes 0 through 3.

A coincidence detecting circuit 70 is connected to the output sides of the respective zero-cross memory circuits 14, 24, 34 so that the zero-cross behavior signals P-ZERO and N-ZERO as well as the zero-cross location codes both stored in the zero-cross memory circuits 14, 24, 34 are applied to the coincidence detecting circuit 70. The coincidence detecting circuit 70 determines whether these zero-cross behavior data coincide with the location codes or not. The control circuit 40 is also connected to the output side of this coincidence detecting circuit 70 so that the zero-cross data coincidence signal is applied to the control circuit 40 when the coincidence is detected.

The count signal from the first counter 50 is applied to an address port 81 of a data memory circuit 80, the count signal from the second counter 60 is applied to a range data port 82 of the data memory circuit 80, and the interpolated location count signal from the interpolated location counter 55 is applied to another range data port 83 of the data memory circuit 80. All of these counter signals from the first counter 50, the second counter 60 and the interpolated location counter 55 are applied also to the control circuit 40. The control circuit 40 applies the data memory circuit 80 with data memory signals on the basis of which the address data and the range data are stored in the data memory circuit 80.

Figure 15:
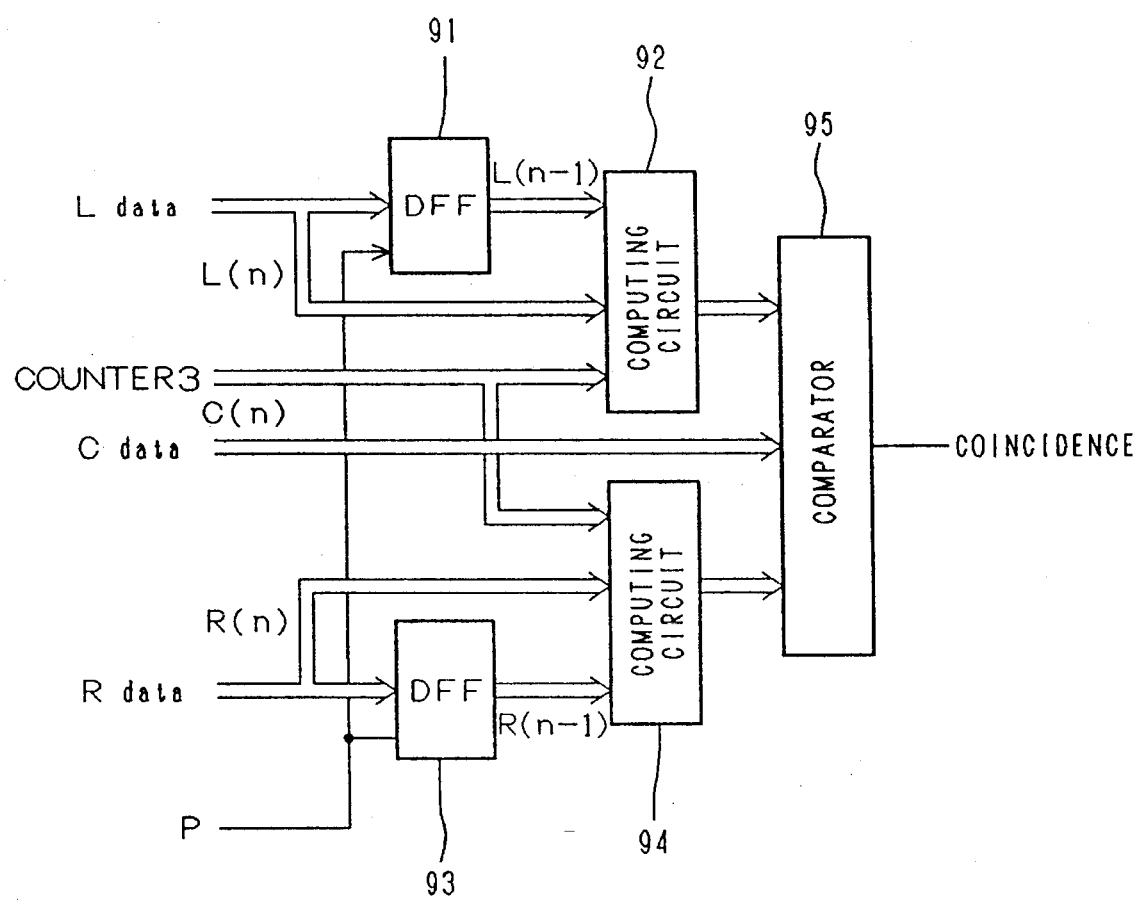
FIG. 15 is a block diagram of the coincidence detecting circuit for the zero-cross data.
Figure 16:
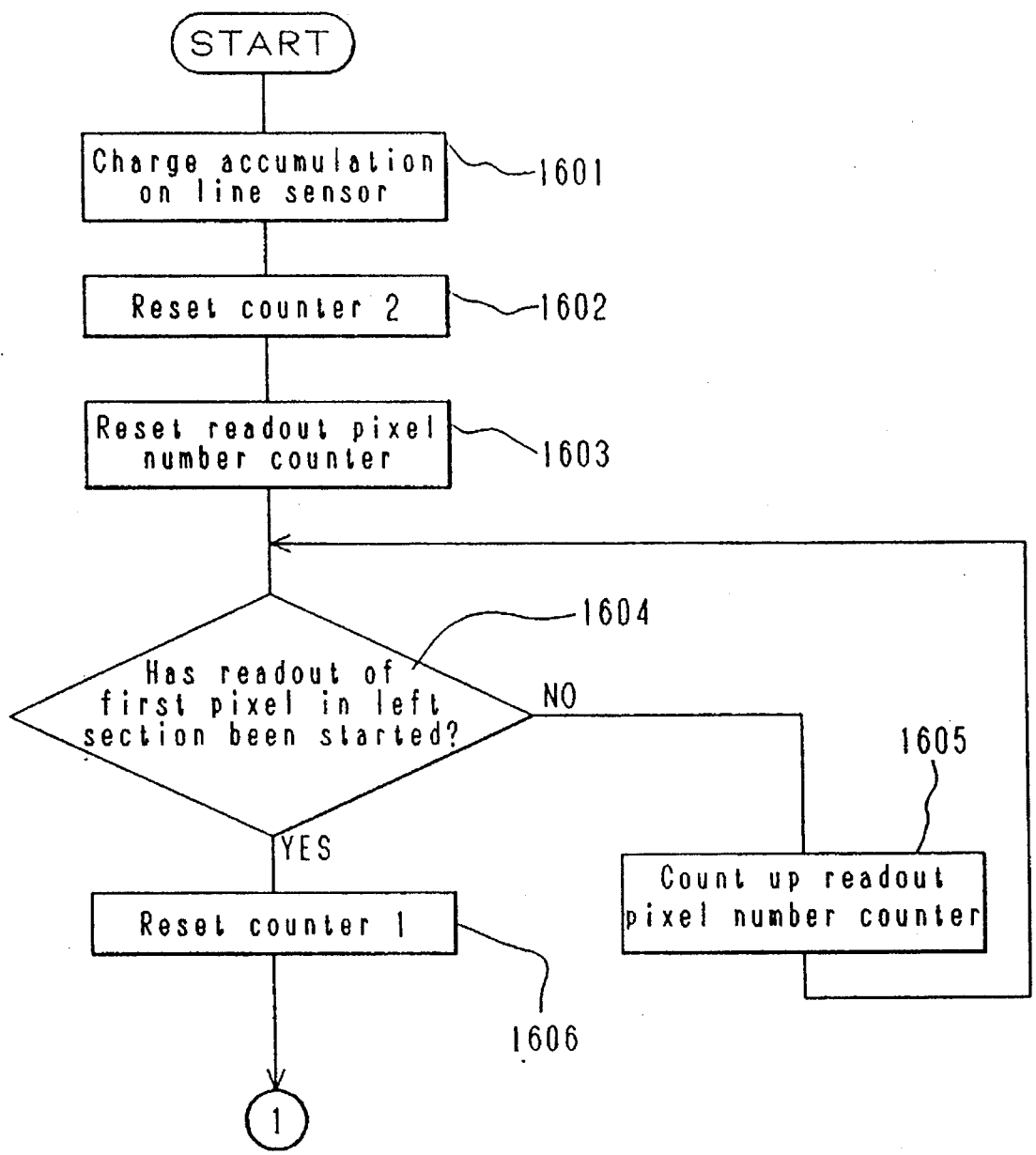
FIG. 16, FIG. 17, FIG. 18, FIG. 19, and FIG. 20 are flow chart of the program routine according to which the data obtained from the line sensor is written into the zero-cross memory circuit particularly with respect to the left side section of the line sensor.
Figure 17:
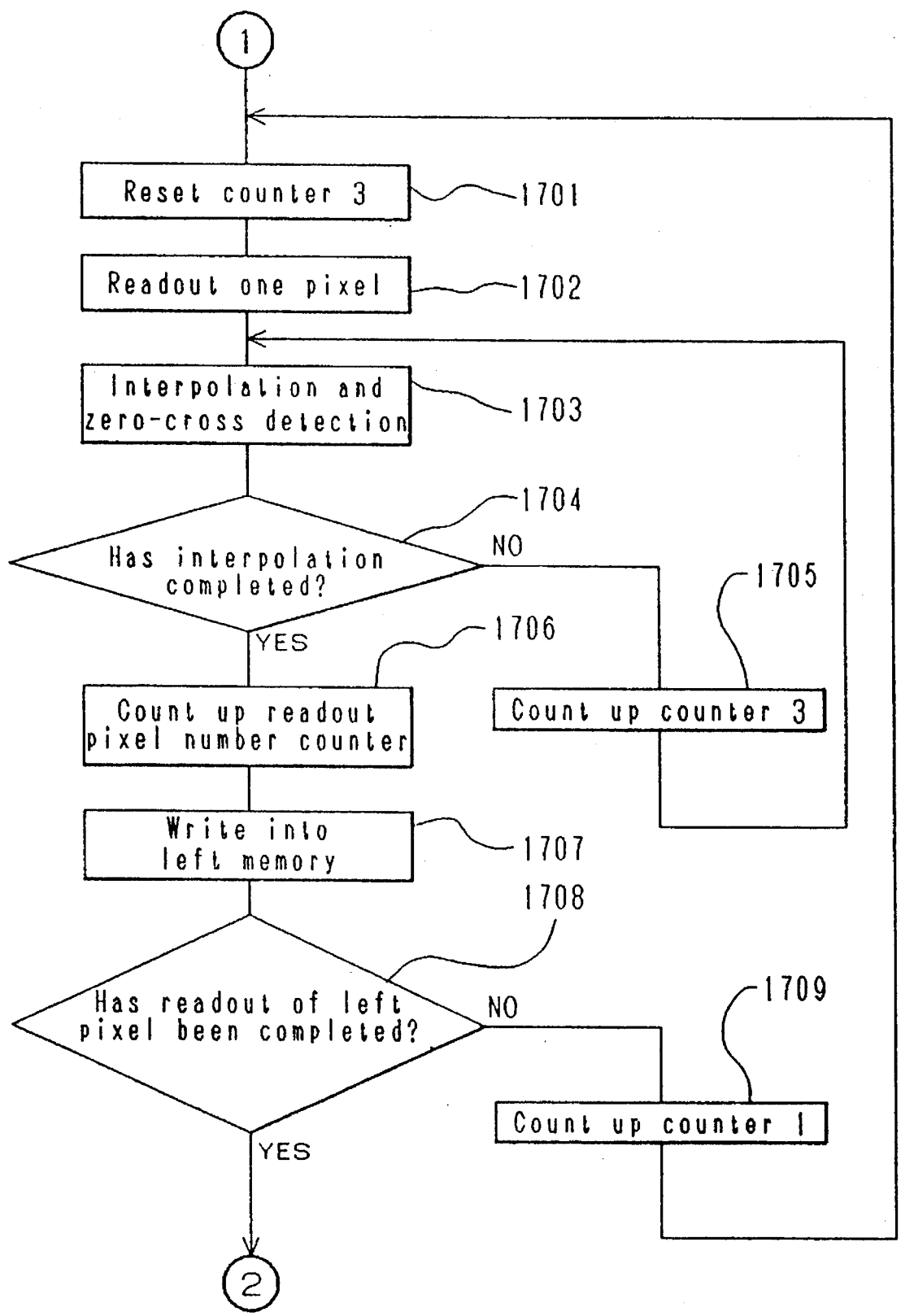
Figure 18:
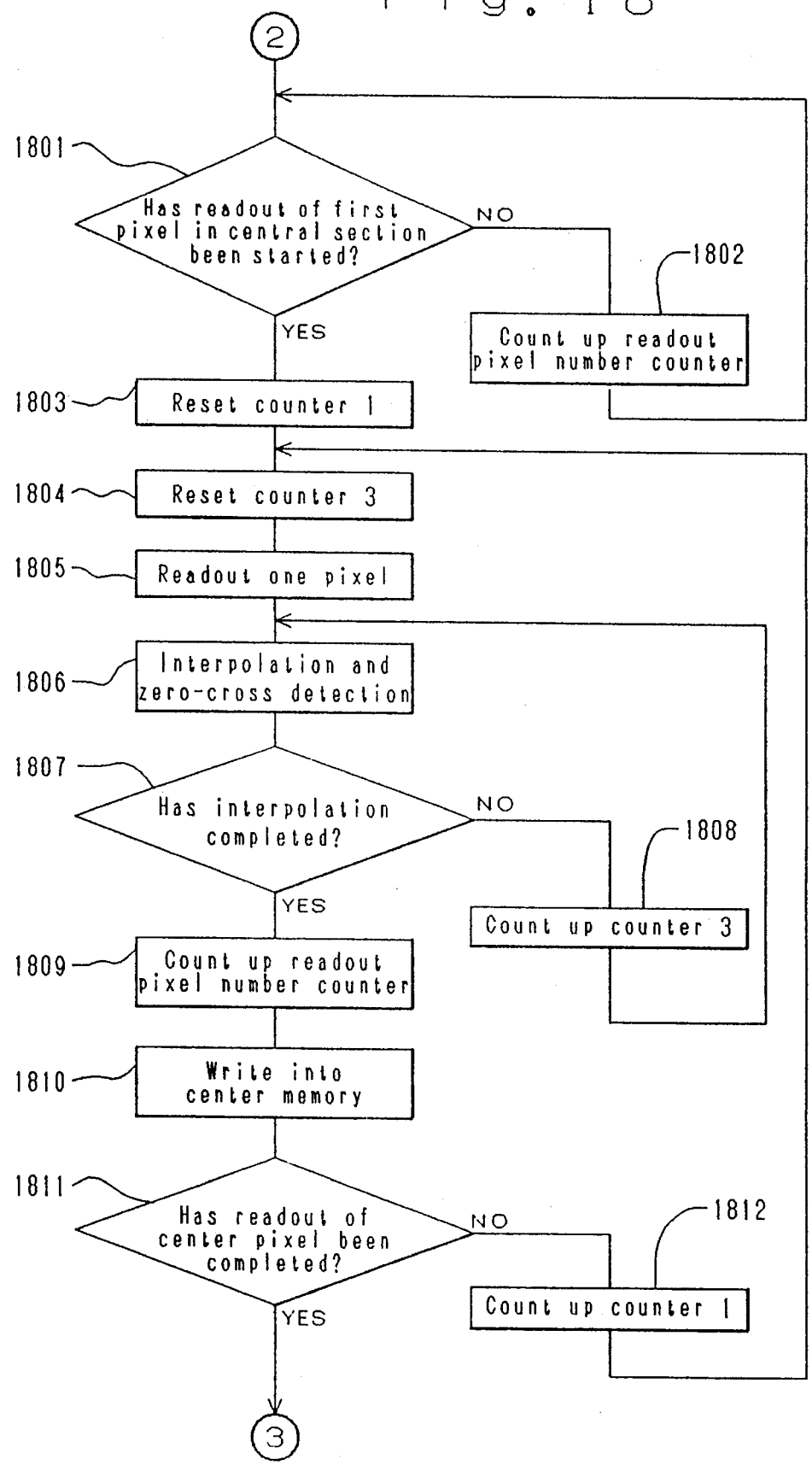
Figure 19:
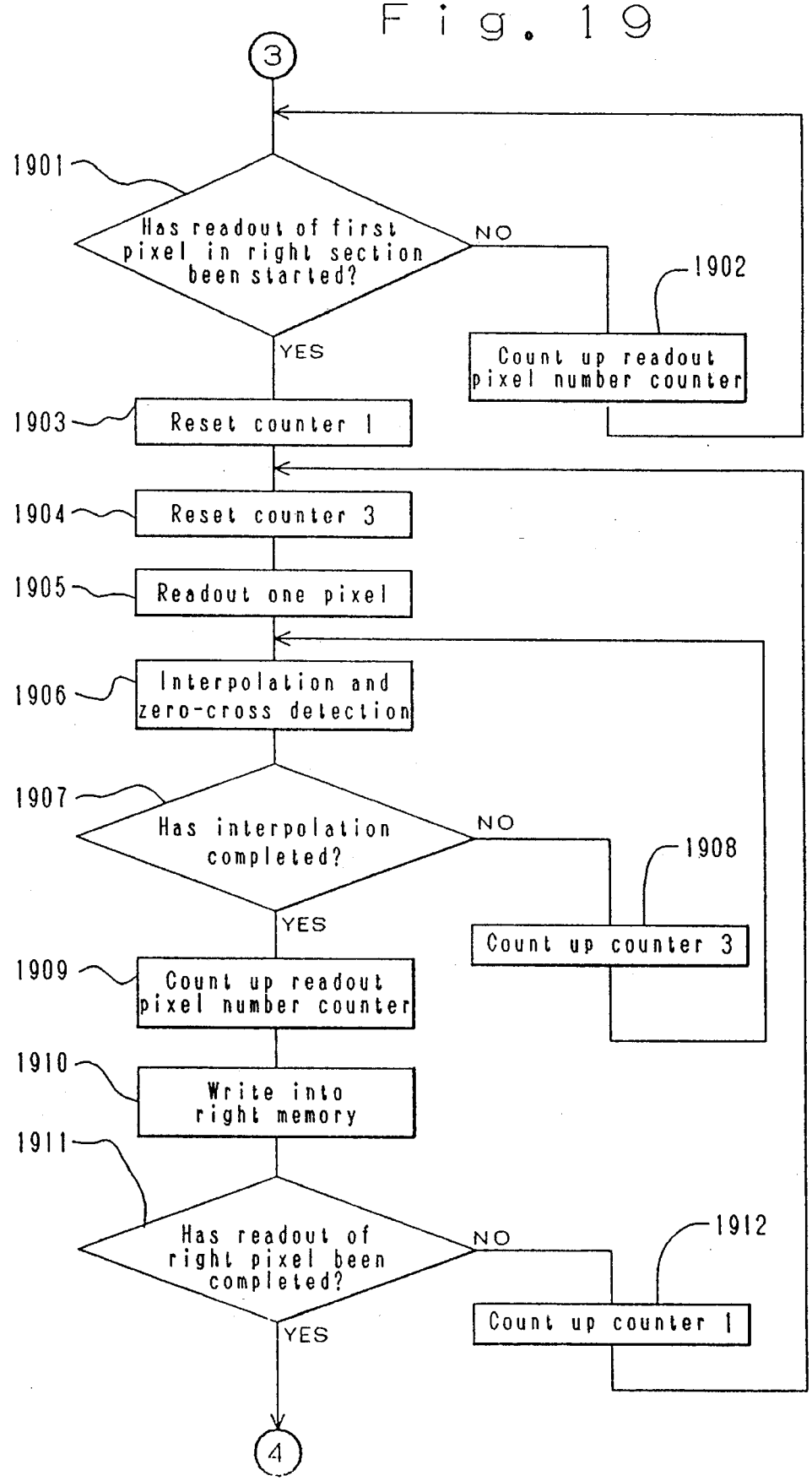
Figure 20:
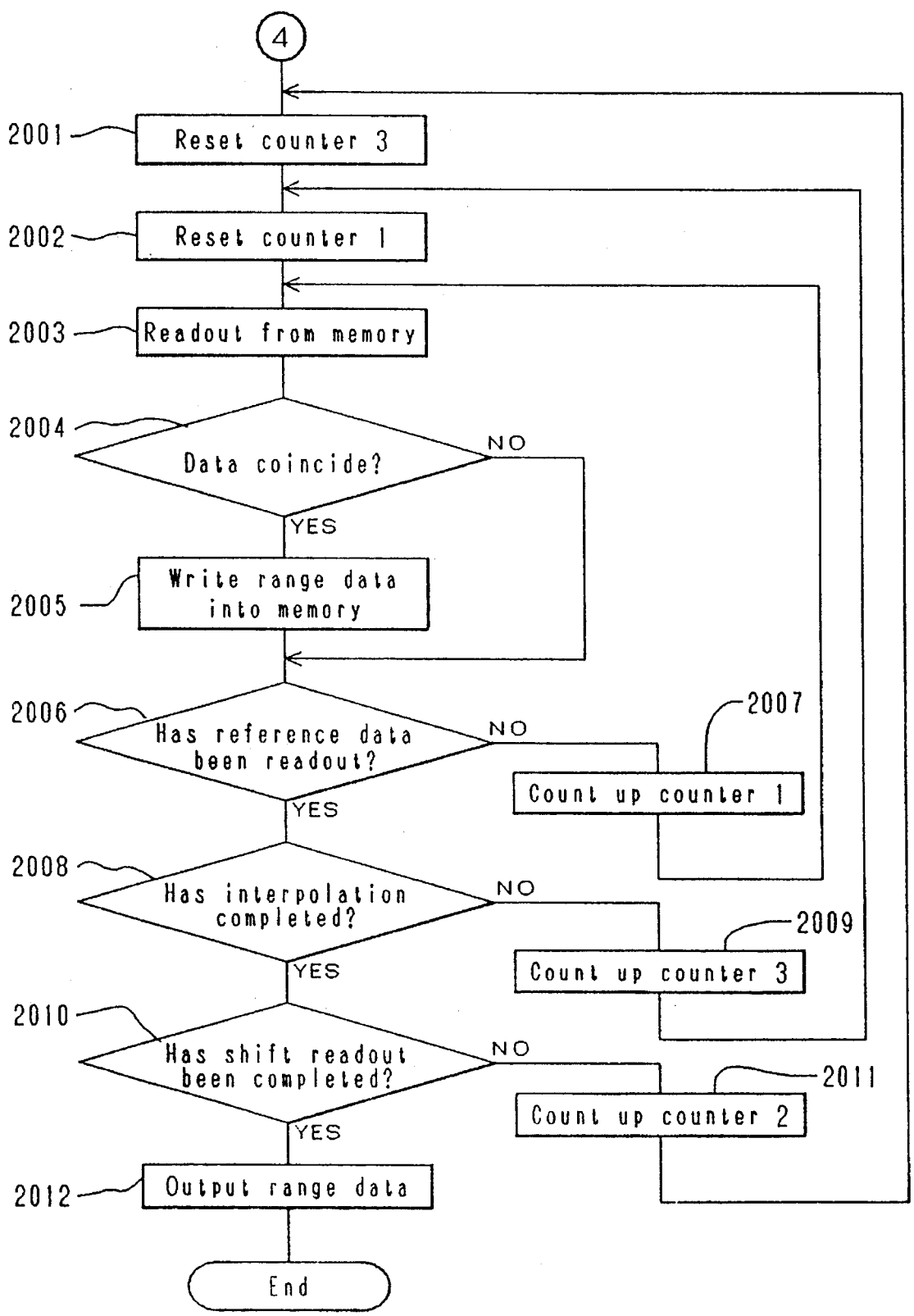

FIG. 15 is a block diagram concerning the coincidence detection occurring in the coincidence detecting circuit 70, in which the scene's luminance data provided from the central line sensor section 10b, the right side line sensor section 20b and the left side line sensor section 30b and stored in the zero-cross memory circuits 14, 24, 34 are represented by C data, R data and L data, respectively. The L data is applied to a D flip-flop 91 and a computing circuit 92, the R data is applied to a D flip-flop 93 and a computing circuit 94. The data latched by the D flip-flop 91 is applied to the computing circuit 92 and the data latched by the D flip-flop 93 is applied to the computing circuit 94. The interpolated location signals (COUNTER 3) from the interpolated location counter 55 are also applied to the computing circuit 92 and the circuit 94, respectively. The output from the computing circuit 92, the output from the computing circuit 94 and the C data are applied to a comparator 95 which provides, in turn, the coincidence data when the comparator 95 determines a coincidence of these computing circuit outputs and the C data.

Referring to FIGS. 16 through 20, a program routine starting from pick-up of the scene's luminance by the line sensor 8, followed by write-in and read-out of the luminance information for the scene will be described. It should be understood that the first counter 50 and the second counter 60 operate in synchronization with the clock pulse P2 while the interpolated location counter 55 operates in synchronization with the clock pulse P3.

Upon depression of a release button (not shown) provided on camera, a range finding starter switch is turned ON and a range finding start signal is applied from the control circuit 40 to the drive control circuit 11a included in the line sensor control means 11. Upon reception of this range finding start signal, the drive control circuit 11a applies the photosensitive monitoring means 7 and the line sensor 8 with the sensor drive signal, thereupon the photosensitive monitoring means 7 and the line sensor 8 being to pick up the luminance distribution of a scene to be photographed. Simultaneously, charge accumulation starts (step 1601). The reference level selecting signal for the first reference level $S_1$ is applied from the drive control circuit 11a to the reference level generating circuit 11d while the amplification factor selecting signal for the first amplification factor $G_1$ is applied from the drive control circuit, 11a to the amplifying circuit 11c and at the same time, counting of a predetermined period $t_0$ is started.

Output from the photosensitive monitoring means 7 depending on the luminance of the scene having been picked up by the photosensitive monitoring means 7 is applied to the integrating is 11b and an integral value provided therefrom is applied to the level detecting circuit 11e. This level detecting circuit 11e is applied from the reference generating is 11d with the first reference level $S_1$ as the detection level, so the integral value is compared with this detection level $S_1$ and, if the integral value exceeds the detection level $S_1$ within the predetermined period $t_0$, the level detecting circuit 11e outputs the detection signal LV whereupon the charge accumulation is completed.

If the detection signal LV is not output within the predetermined period $t_0$, the drive control circuit 11a applies the photosensitive monitoring means 7 and the line sensor 8 with the sensor drive signal in response to which the photosensitive monitoring means 7 and the line sensor 8 terminate the charge accumulation, release the charge already accumulated and start again the charge accumulation. Simultaneously, the drive control circuit 11a outputs the reference level selecting signal for the second reference level $S_2$ and the amplification factor selecting signal for the second amplification factor $G_2$. Consequently the second reference level $S_2$ is applied from the reference level generating circuit 11d to the level detecting circuit 11e as the detection level and the integral value provided from the integrating circuit 11b by integrating the output of the photosensitive monitoring means 7 is compared with the detection level $S_2$. As will be apparent from FIG. 2, when the integral value exceeds the detection level $S_2$, the level detecting circuit 11e output the detection signal LV and the charge accumulation is completed.

Upon reception of the detection signal LV from the level detecting circuit 11e, the drive control circuit 11a applies the shift gate section 8b of the line sensor 8 with the transfer signal SH in response to which the shift gate section 8b of the line sensor 8 is opened and the line sensor 8 terminates the charge accumulation, so the charge having been accumulated to this time point, namely, the luminance data of the scene is transferred to the register 8c which sends, in turn, the information on luminance distribution of the scene to be photographed to the amplifying circuit 11c. The amplifying circuit 11c amplifies the output signal of the line sensor 8 at the amplification factor selected according to instruction from the drive control circuit 11a. Specifically, the output signal from the line sensor 8 will be amplified at the first amplification factor $G_1$ when the integral value of output from the photosensitive monitoring 7 exceeds the first detection level $S_1$ within the predetermined period $t_0$ after initiation or charge accumulation and the detection signal LV is output, and at the second amplification factor $G_2$ when the integral value does not exceed within the predetermined period $t_0$ and the detection signal LV is output only after the integral value has exceeded the second detection level $S_2$.

During charge accumulation in the line sensor 8, a relatively high luminance of the scene to be photographed is suggested when the integral value exceeds the first reference level $S_1$ within the predetermined period $t_0$ and a relatively low luminance of the scene is suggested when the integral value does not exceed the first reference level $S_1$ within the predetermined period $t_0$. The first amplification factor $G_1$, is associated with the first reference level $S_1$ while the second amplification factor $G_2$ is associated with the second reference level $S_2$ and the second amplification factor $G_2$ is adjusted to be higher than the first amplification factor $G_1$, so the video signal output from the line sensor 8 is amplified by the amplifying circuit 11c so as to have a practically constant signal level even for scenes of different luminances.

Upon completion of charge accumulation in the line sensor 8 (step 1601), the second counter 60 is reset (step 1602) and a read-out pixel number counter (not shown) included in the control circuit, 40 is reset (step 1603).

It is determined from a count value of the read-out pixel number counter whether read-out of a first pixel in the left side line sensor section 30b of the single line sensor 8 has been started or not (step 1604) and the pixels are output one by one (step 1605) until data corresponding to the first pixel begins to be read out. When the data corresponding to the first pixel begins to be read out, the routine proceeds to a step 1606 to reset the first counter 50.

Then the routine proceeds to a step 1701 (See FIG. 17) to reset a counter 3 and thereafter data corresponding to one pixel in the left side line sensor section 30b is read out (step 1702). The routine proceeds to a step 1703 to execute the interpolative computation according to the equation (9) and thereby to obtain an interpolated data NDIFF/N. Thus, the sign signal SIGN and the zero-cross point of the interpolated data are detected. It should be understood that the interpolative computation is executed on the basis of the interpolated location counter 55 being counted up and the interpolated location count value at the moment of zero-cross detection is stored (not shown). The routine then proceeds to a step 1704 to determine from the count value of the interpolated location counter 55 whether the interpolation has been completed or not, i.e., whether or not the single pixel read out at the previous step 1702 has been interpolated by dividing this pixel into a predetermined sections. If not completed, the routine proceeds to a step 1705 to count up the interpolated location counter 55 and then returns to the step 1703. Thus, step 1703 and step 1704 are repeated until the interpolation is completed. After the interpolation has been completed, the routine proceeds to a step 1706.

The step 1706 counts up the read-out pixel number counter and then the routine proceeds to a step 1707 to write the interpolated location data corresponding to one pixel in the left side line sensor section 30b which was read out and interpolated at step 1702 into the left side zero-cross memory circuit 34. The routine then proceeds to a step 1708 to determine from the count value of the first counter 50 whether all the pixels contained in the left side line sensor section 30b have been read out or not and, if not, the routine proceeds to a step 1709 to count up the first counter 50 and then returns to the step 1701, followed by read-out of one pixel (step 1702), interpolation and zero-cross detection (step 1703) and writing into the left side zero-cross memory circuit 34 (step 1707). The data written into the left side zero-cross memory circuit 34 is stored at the address assigned by the address computing circuit 35, based on the count signal provided from the first counter 50. The data to be stored comprise the zero-cross location data and the polarity data, and the address at which the data is to be stored is assigned according to the previously mentioned equation (12).

If read-out of all the pixels in the left side line sensor section 30b has been completed and thus conclusion of the step 1708 is YES, the routine proceeds to a step 1801 (See FIG. 18) to determine from the count value of the read-out pixel number counter whether read-out of the first pixel in the central line sensor section 10b has been started or not and the pixels are output one by one (step 1802) until read-out of the first pixel starts. If read-out of the first pixel has been started, the first counter 50 is reset (step 1803) and then the steps similar to the steps 1701 through 1709 are repeated with respect to the central line sensor section 10b. Specifically, after the interpolated location counter 55 has been reset (step 1804), read-out of one pixel is executed (step 1805), completion of the interpolation is determined on the basis of the interpolated location count value (step 1807, 1808) while the interpolation and the zero-cross detection are executed (step 1806), followed by counting up of the read-out pixel number counter (step 1809) and writing of the data associated with the one pixel having been read out into the central zero-cross memory circuit 14 (step 1810). It is determined from the count value of the first counter 50 whether all the pixels of the central line sensor section 10b have been read out (step 1811), with the first counter 50 being counted up (step 1812). The address at which the data is to be stored is assigned according to the previously mentioned equation (10).

If all the pixels in the central line sensor section 10b have been read out, and such that conclusion of the step 1811 is YES, the routine proceeds to a step 1901 (See FIG. 19) to determine from the count value of the read-out pixel number counter whether read-out of the first pixel in the right side line sensor section 20b has been started or not while the pixels are output one by one (step 1902) and, if read-out of the first pixel has been started, the first counter 50 is reset (step 1903). Then the steps similar to those for the left side line sensor section 30b and the central line sensor section 10b are repeated for the right side line sensor section 20b. Specifically, after the interpolated location counter 55 has been reset (step 1004), read-out of one pixel is executed (step 1905), completion of the interpolation is determined on the basis of the interpolated location count value (step 1907, 1908) while the interpolation and the zero-cross detection are executed (step 1906), followed by count up of the read-out pixel number counter (step 1909) and writing of the data associated with the one pixel having been read out Into the right side zero-cross memory circuit 24 (step 1910). It is determined from the count value of the first counter 50 whether all the pixels of the right side line sensor section 20b have been read out (step 1911) with the first counter 50 being counted up (step 1912). The data written into the right side zero-cross memory circuit 24 is stored at the address assigned by the address computing circuit 25 according to the previously mentioned equation (11), based on the count signal provided from the first counter 50.

If read-out of all the pixels in the line sensor 8 has been completed and thus conclusion of the step 1911 is YES, the routine proceeds to a step 2001 (See FIG. 20) to reset the interpolated location counter 55 and then the first counter 50 is reset (step 2002). The data written at the previously mentioned steps 1707, 1810, 1910 into the zero-cross memory circuits 14, 24, 34, respectively, are read out therefrom (step 2003) and it is determined by the coincidence detecting circuit 70 whether the data read out from the central zero-cross memory circuit 14, the right side zero-cross memory circuit 24 and the left side zero-cross memory circuit 34 coincide with one another or not (step 2004).

Assuming that the number of interpolations is four (4), the coincidence detecting is 70 will detect the coincidence of C data, R data and L data on the basis of the location data converted to

| | |
|---|---|
| r(n) + 4 − COUNTER 3 | for location data, R(n) |
| r(n−1) − COUNTER 3 | for location data, R(n−1) |
| l(n) + COUNTER 3 | for location data, L(n), and |
| l(n−1) − 4 + COUNTER 3 | for location data, L(n−1) | and the corresponding polarity data, where r(n) and l(n) represent location data portions of R(n) and L(n), respectively. FIG. 21 illustrates the coincidence detecting operation executed by the circuit arrangement shown by FIG. 15. As illustrated, the coincidence detection is executed as the COUNTER 3 is incremented, with the data corresponding to one pixel of C data remaining fixed. It is assumed here that, for L data, the divided location codes of the location data L(n−1), L(n) and L(n+1) are arranged in the order of −4 through 7 starting from the uppermost bit and, for R data, the divided location codes of the location data R(n−2), R(n−1)

and R(n) are arranged in the order of −4 through 7 starting from the uppermost bit. When the interpolated location count signal is zero (COUNTER 3=0), the location codes 0 through 3 of L data and the location codes 0 through 3 of R data are compared with the location codes 0 through 3 of C data. When the COUNTER 3 is counted up so as to establish COUNTER 3=1, the location codes 1 through 4 of L data and the location codes −1 through 2 of R data are converted to the location codes 0 through 3 of C data. When COUNTER 3=2, the location codes 2 through 5 of L data and the location codes −2 through 1 are converted to the location codes 0 through 3 to be compared with the location codes 0 through 3 of C data. When COUNTER 3=3, the location codes 3 through 6 of L data and the location codes −3 through 0 of R data are converted to the location codes 0 through 3 to be compared with the location codes 0 through 3 or C data.

If the data coincidence is determined, the routine proceeds to a step 2005 to write a current value of the count signal (COUNTER 1) provided from the first counter 50 as the address data, a current value of the count signal (COUNTER 2) provided from the second counter 60 as the higher bit of the range data, and a current value of the interpolation count signal (COUNTER 3) provided from the interpolated location counter 55 as the lower bit of the range data into the data memory circuit 80. If the conclusion of step 2004 is NO, the routine proceeds to a step 2006 to determine from a count value of the first counter 50 whether read-out of the stored data (reference data) corresponding to all the effective pixels of the central line sensor section 10b has been completed or not and, if not, the routine proceeds to a step 2007 to count up the first counter 50. Then, the routine returns to the step 2003 to repeat the steps 2003 through 2006.

If read-out of the reference data is determined to have been completed, the routine proceeds from the step 2006 to a step 2008 to determine from a value of the interpolated location counter 55 whether the interpolation has been completed or not, i.e., whether the data coincidence has been detected in reference with the predetermined number of location codes. If the interpolation has not been completed, the routine proceeds to a step 2009 to count up the interpolated location counter 55 and then returns to the step 2002 to repeat steps 2002 through 2008. If the conclusion of the step 2008 is YES, the routine proceeds to a step 2010 to determine from a count value of the second counter 60 whether or not the data stored in the right side zero-cross memory circuit 24 and the left side zero-cross memory is 34 have been shifted by a given amount with respect to the data stored in the central zero-cross memory circuit 14 and the steps 2001 through 2008 have been executed (shift read-out). If the shift read-out has not been completed, the second counter 60 is counted up and the routine returns to the step 2001 and thus the steps 2002 through 2010 are repeated. Upon completion of the shift read-out, the routine proceeds to a step 2012.

Read-out of the stored data during these steps 2002 through 2011 is executed with the help of the first counter 50 and the address computing circuits 25, 35 which designate the respective addresses according to the following equations corresponding to the previously mentioned equations (10), (11) and (12), respectively: i.e., $$\text{ADDRESS} = \text{COUNTER 1} - 1 \quad (13)$$

for central zero-cross memory circuit 14, $$\text{ADDRESS} = \text{COUNTER 1} + \text{COUNTER 2} \quad (14)$$

for the right side zero-cross memory circuit 24, and $$\text{ADDRESS} = \text{COUNTER 1} + S - 1 - \text{COUNTER 2} \quad (15)$$

for the left side zero-cross memory circuit 34. In the equation (15), S represents a constant. A relationship established here between write-in address and read-out address will be explained with reference with FIGS. 22(a) and 22(b). No read-out occurs if the address is negative.

Figure 22A:
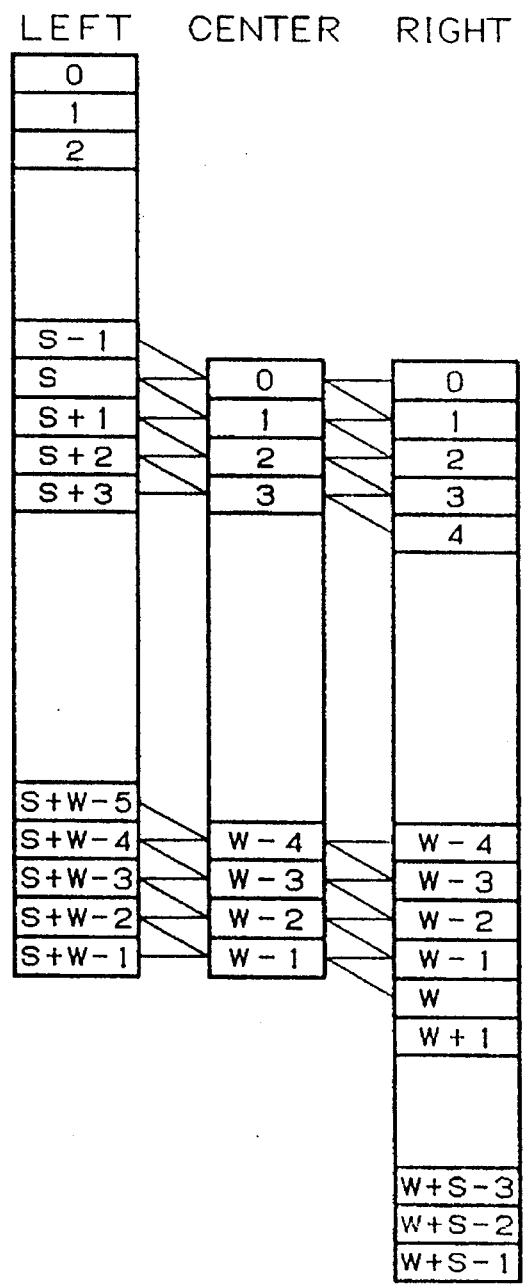
FIGS. 22(a) and 22(b) are diagrams illustrating the procedure to read and compare the data stored in the zero-cross memory circuits.

FIG. 22(a) illustrates the case in which the count signal from the second counter 60 is set to 0 (COUNTER 2=0). In such case, the data stored at the addresses corresponding to the respective pixels in the line sensor sections 10b, 20b, 30b are successively compared one to another with the first counter 50 being successively incremented. From 0 to W (step 2007) to detect a coincidence of these data. Accordingly, if COUNTER 2=0, the address will be Incremented from 0 to (W−1) for the pixels in the central line sensor section 10b, from 0 to W for the pixels in the right side line sensor section 20b and from (S-1) to (S+W−1) for the left side line sensor section 30b. Thus, as will be apparent from FIG. 21, the pixels contained at a pair of adjacent addresses in each of the right side zero-cross memory circuit 24 and the left side zero-cross memory circuit 34 are successively shifted, in the order of the location codes corresponding to each address divided by the number of interpolations, relative to the pixel contained at a single address in the central zero-cross memory circuit 14 until a coincidence is detected.

Figure 22B:
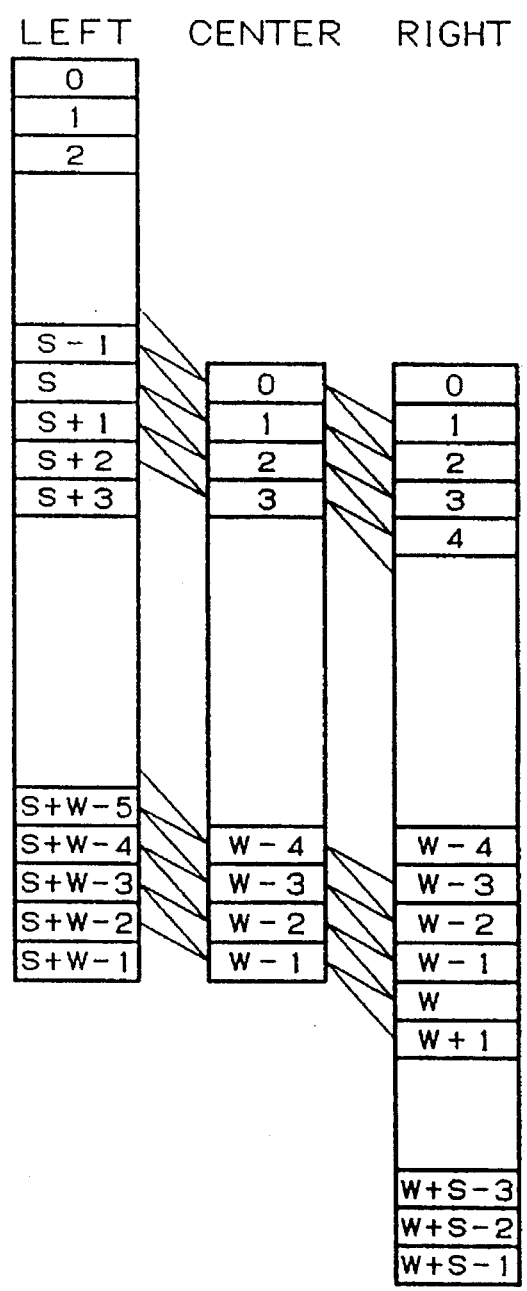
Figure 23:
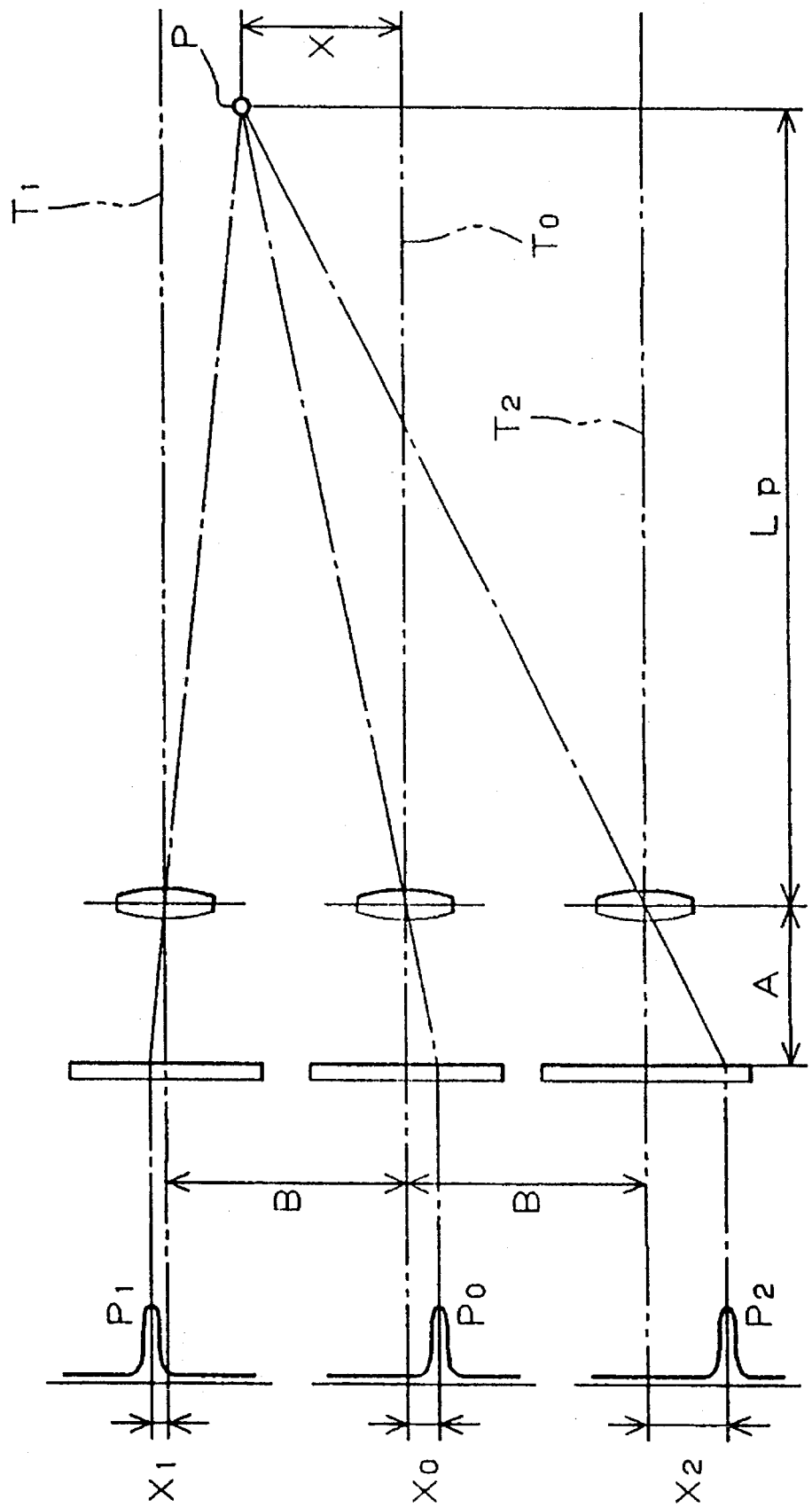
FIG. 23 is an optical path diagram illustrating a principle of range finding.
Figure 24A:
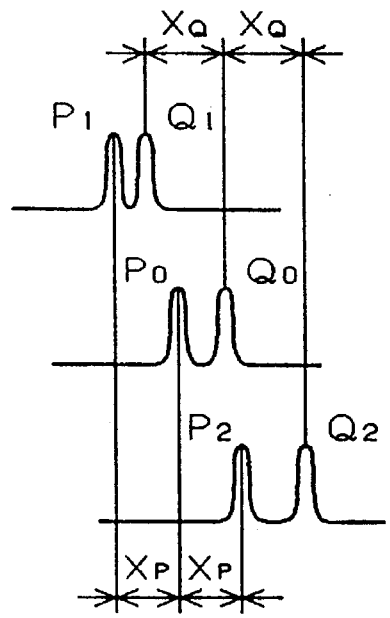
FIGS. 24(a), 24(b) and 24(c) are signal diagrams based on the luminance distribution of the scene detected by the photodetector arrays according to the principle of range finding.
Figure 24B:
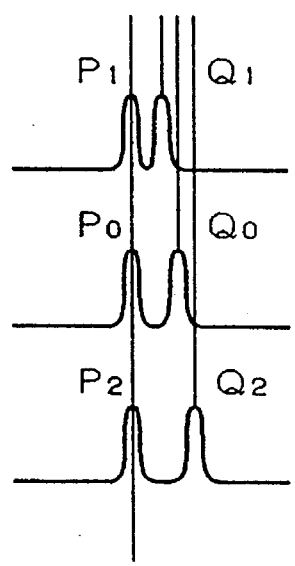
Figure 24C:
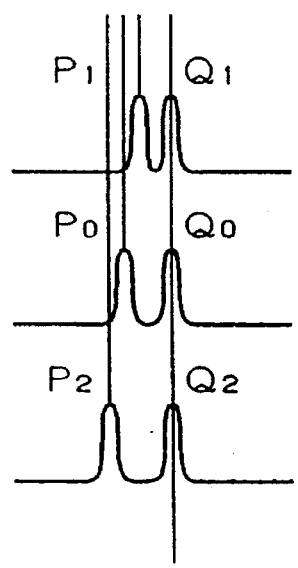

Then, the second counter 60 is incremented (step 2011). With the count signal of the second counter 60 being set to 1 (COUNTER 2=1) as illustrated by FIG. 22(b), the data stored at the addresses corresponding to the pixels constituting the respective sections 10b, 20b, 30b of the line sensor 8 are compared one to another with the first counter 50 being incremented from 0 to W (step 2007) to detect their coincidence. Accordingly, at the state of COUNTER 2=1, the address is incremented from 0 to (W−1) for the central line sensor section 10b, from 1 to (W+1) for the right side line sensor section 20b and from (S−2) to (S+W−2) for the left side line sensor section 30b. In other words, the data contained in the location codes constituting a pair of adjacent addresses in each of the right side zero-cross memory is 24 and the left side zero-cross memory circuit 34 are successively shifted relative to the data contained In the location codes constituting a single address in the central zero-cross memory circuit 14 until a coincidence is detected.

Coincidence detection is repeated with the second counter 60 being incremented up to COUNTER 2=S-1 (step 2011).

More specifically, a value, containing the count value of the second counter 60 at the moment when the data stored in the respective zero-cross memory circuits 14, 24, 34 come in coincidence with one another as the highest bit and the count value of the interpolated location counter 55 as the lower bit, corresponds to the amount of shift Xp in the previously mentioned equation (6). At the step 2005, this amount of shift is stored in the data memory circuit 80 as the range data.

If the step 2010 determines that read-out of the given shift has been completed, the routine proceeds to a step 2012 at which the range data having been written into the data memory circuit 80 at the step 2005 is applied to an objective driver (not shown) so that the objective may be moved so as to focus the camera on the scene to be photographed.

According to this Embodiment 1, there is provided the photosensitive monitoring means and an integral value of the output from this photosensitive monitoring means is compared with a pair or higher and lower reference levels, respectively, wherein the integral value is compared with the higher reference level only within a predetermined period and with the lower reference level when the scene to be photographed is of a relatively low luminance. Accordingly, the video signal output from the line sensor is amplified at a higher amplification factor when the integral value is compared with the lower reference level and at a lower amplification factor when the integral value is compared with the higher reference level so that the zero-cross detecting signal of a practically constant level may be obtained independently of the scene's luminance. In this manner, the period elapsing before pick-up of the scene's luminance and charge accumulation by the line sensor is completed can be varied according to the luminance of scene and thereby the range finding can be achieved within a conveniently short period.

Embodiment 2

Embodiment 2 will be described in reference with FIGS. 1 and 3. Construction of the line sensor control means herein used is similar to that shown in FIG. 1 and the manner in which the luminance data of the scene to be photographed is processed is also similar to that in Embodiment 1 as shown by FIGS. 9 through 22.

Figure 3:
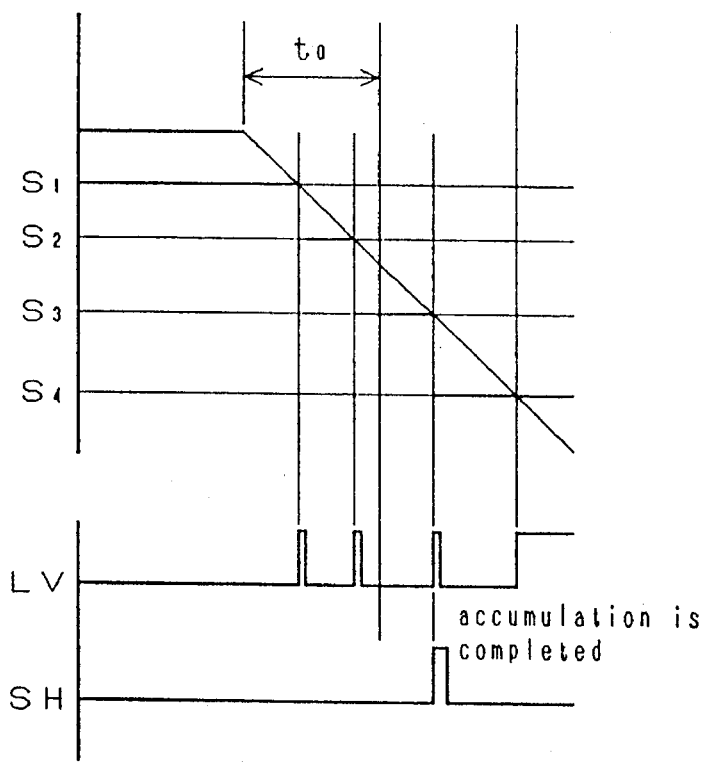
FIGS. 3(a) and 3(b) are time charts showing the manner in which the second embodiment of line sensor control means operates until charge accumulation in the line sensor is completed.
Figure 3:
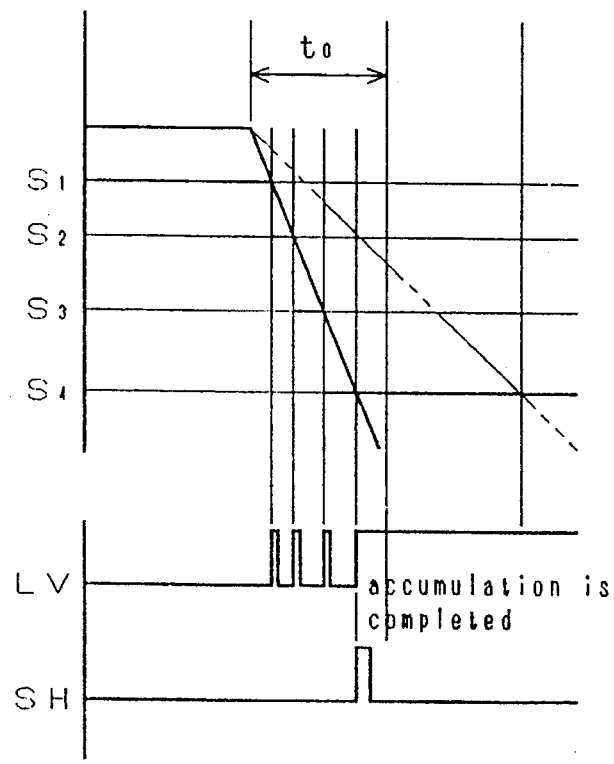

As shown by FIG. 3, a plurality of reference levels $S_1$, $S_2$, $S_3$, $S_4$ are set for the reference level generating circuit 11d so as to be in relationship of $S_1<S_2<S_3<S_4$. One of these reference levels $S_1$, $S_2$, $S_3$, $S_4$ selected on the basis of the reference level selecting signal output from the drive control circuit 11a is applied to the level detecting circuit 11e. A plurality of amplification factors $G_1$, $G_2$, $G_3$, $G_4$ are set for the amplifying circuit 11c so as to be in relationship of $G_1>G_2>G_3>G_4$ and the signal output from the line sensor 8 is amplified at one of these amplification factors $G_1$, $G_2$, $G_3$, $G_4$ selected on the basis of the amplification factor selecting signal applied from the drive control circuit 11a. The drive control circuit 11a sets, for the amplifying circuit 11c, the amplification factor $G_1$ when the reference level $S_1$ is selected, the amplification factor $G_2$ when the reference level $S_2$ is selected, the amplification factor $G_3$ when the reference level $S_3$ is selected, and the amplification factor $G_4$ when the reference level $S_4$ is selected. In other words, $S_1$ is combined with $G_1$, $S_2$ is combined with $G_2$, $S_3$ is combined with $G_3$ and $S_1$ is combined with $G_4$. The drive control circuit 11a outputs the reference level signal so as to select the reference level from the lower to the higher, i.e., in the order of $S_1$, $S_2$, $S_3$, $S_4$. The drive control circuit 11a is responsive to the detection signal LV output in association with the maximum reference level $S_4$ within the predetermined period $t_0$ or to the first detection signal LV output after the predetermined period $t_0$ has elapsed to apply the line sensor 8 with the transfer signal SH, one of the sensor drive signals. Upon reception of this transfer signal SH, the shift gate section 8b is opened, whereupon the luminance data of the scene having been picked up by the line sensor 8 is transferred to the register 8c which applies, in turn, this data to the amplifying circuit 11c.

According to this Embodiment 2, upon depression of the release button of the camera (not shown), the range finding starter switch is turned ON and the range finding start signal is applied from the control circuit 40 to the drive control circuit 11a of the line sensor control means 11. Upon reception of this range finding start signal, the drive control circuit 11a applies the photosensitive monitoring means 7 and the line sensor 8 with the sensor drive signal so that these photosensitive monitoring means 7 and the line sensor 8 initiate pick-up of the scene's luminance and charge accumulation (step 1601). The drive control circuit 11a applies the reference level generating circuit 11d with the reference level selecting signal for the minimum reference level $S_1$, on one hand, and the amplifying circuit 11c with the amplification factor selecting signal for the maximum amplification factor $G_1$, on the other hand, whereupon counting of the predetermined period $t_0$ is started.

Output from the photosensitive monitoring means 7 depending on the scene's luminance picked up by this photosensitive monitoring means 7 is applied to the integrating circuit 11b and the resultant integral value is applied to the level detecting circuit 11e. This integral value is compared with the minimum reference level $S_1$ having been applied to the reference generating circuit 11d as the detection level and, as will be apparent from FIG. 3, if the integral value exceeds the detection level $S_1$, the detection signal LV is output from the level detecting circuit 11e.

Upon reception of this detection signal LV, the drive control circuit 11a applies the reference level generating circuit 11d with the reference level selecting signal for the second lowest reference level $S_2$ and applies the amplifying circuit 11c with the amplification factor selecting signal for the second highest amplification factor $G_2$, as counting of the predetermined period $t_0$ is continued. Accordingly, the integral value provided from the integrating circuit 11b is compared with the detection level $S_2$ in the detecting circuit 11a. As will be apparent from FIG. 3, if the integral value exceeds the detection level $S_2$ within the predetermined period $t_0$, the detection signal LV is output from the level detecting circuit 11e.

Upon reception of this detection signal LV, the drive control circuit 11a applies the reference level generating circuit 11d with the reference level selecting signal for the second highest reference level $S_3$ and applies the amplifying circuit 11c with the amplification factor for the second lowest amplification factor $G_3$, as counting of the predetermined period $t_0$ is continued. If the integral value exceeds the detection level $S_3$ after the predetermined period $t_0$ has elapsed, as shown by FIG. 3(a), the detection signal (accumulation completed signal) LV indicating completion of charge accumulation is output from the level detecting circuit 11e.

If the integral value exceeds the detection level $S_3$ before the predetermined period $t_0$ elapses, as shown by FIG. 3(b), the level detecting circuit 11e outputs the detection signal LV. Upon reception of this detection signal LV, the drive control circuit 11a applies the reference level generating circuit 11d with the reference level selecting signal for the maximum reference level $S_4$ and applies the amplifying circuit 11c with the amplification factor for the minimum amplification factor $G_4$, as counting of the predetermined period $t_0$ is continued. Even after the predetermined period $t_0$ has elapsed, the detection signal (accumulation completed signal) LV indicating completion of charge accumulation is output from the level detecting circuit 11e when the integral value exceeds the detection level $S_4$.

More specifically, the integral value generated by integrating the output from the photosensitive monitoring means 7 in the integrating circuit 11b is compared with the reference level within the predetermined period $t_0$ as the reference level is successively shifted from the minimum reference level toward the maximum reference level in response to the detection signal LV output from the level detecting circuit 11e. If the integral value exceeds the reference level after the predetermined period $t_0$, charge accumulation is terminated with the first detection signal LV after the predetermined period $t_0$ has elapsed and, if the integral value exceeds the reference level within the predetermined period $t_0$, charge accumulation is terminated with the detection signal LV output at the moment when the integral value exceeds the maximum reference level $S_4$.

Upon reception of the detection signal LV indicating completion of charge accumulation from the level detection circuit 11e, the drive control circuit 11a applies the gate shift section 8b of the line sensor 8 with the transfer signal SH. With this transfer signal SH applied, the shift gate section 8b is opened and the line sensor 8 terminates charge accumulation so that the charge having been accumulated to this time point, i.e., the luminance data of the scene to be photographed is transferred to the register 8c which applies, in turn, the amplifying circuit 11c with information on the luminance distribution of this particular scene. The amplifying circuit 11c amplifies the output signal of the line sensor 8 at the amplification factor selected according to the instruction applied from the drive control circuit 11a. Thus, the output signal of the line sensor 8 is amplified at the amplification factors $G_1$, $G_2$, $G_3$, $G_4$ combined with the reference levels $S_1$, $S_2$, $S_3$, $S_4$, respectively, selected at the moment when the accumulation completed signal LV is output.

During charge accumulation in the line sensor 8, a relatively high luminance of the scene is suggested when the integral value exceeds the maximum reference level $S_4$ and simultaneously the accumulation completed signal LV is output, and a relatively low luminance of the scene is suggested when the integral value exceeds the minimum reference level $S_1$ and simultaneously the accumulation completed signal LV is output. The minimum amplification factor $G_4$ is combined with the maximum reference level $S_4$ and the maximum amplification factor $G_1$ is combined with the minimum reference level $S_1$, so the video signal output from the line sensor 8 is amplified by the amplifying circuit 11c so as to have a practically constant signal level even for scenes of different luminances.

Embodiment 3

Figure 4:
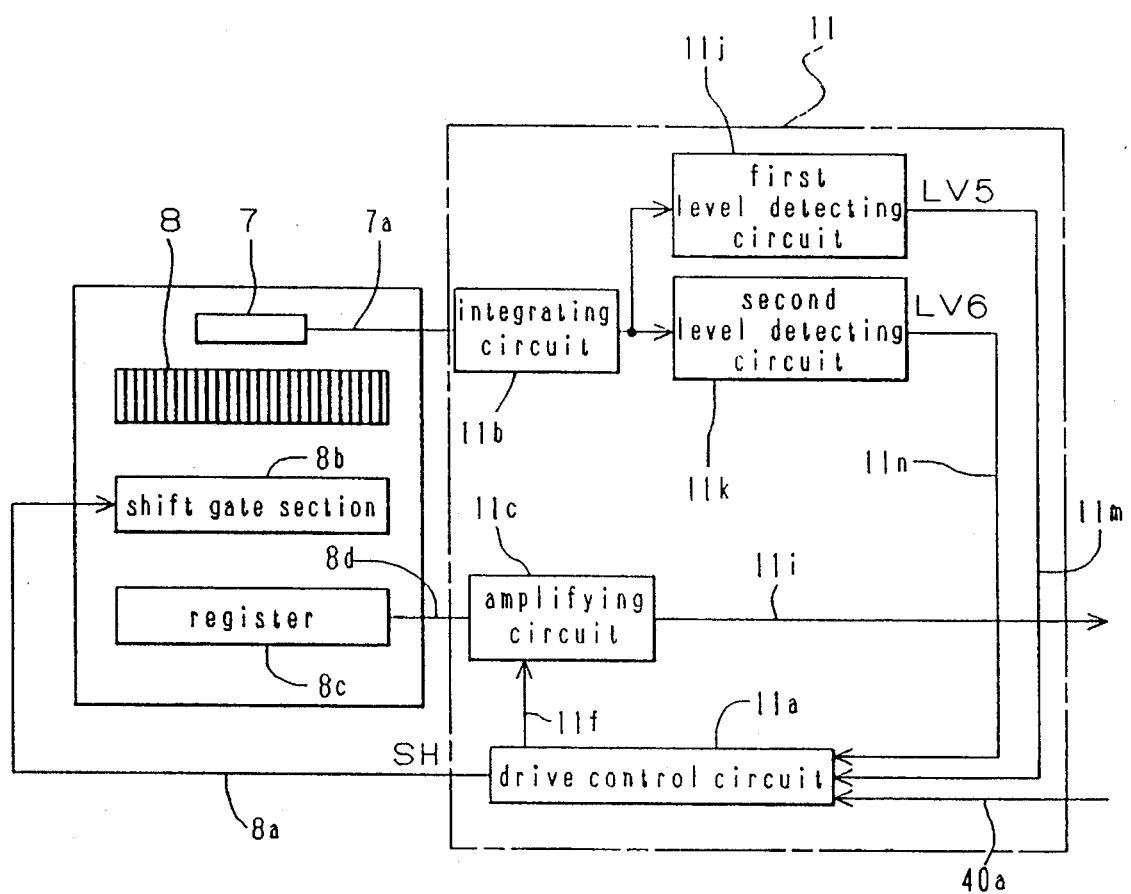
FIG. 4 is a block diagram illustrating a third embodiment of line sensor control means used to control charge accumulation as well as transfer of accumulated charge occurring in the line sensor of the range finder for passive type autofocusing device constructed in accordance with the invention.

Compared to Embodiment 2 having four reference levels to be compared with the integrated output of the photosensitive monitoring means 7, the circuit arrangement can be simplified by setting a pair of reference levels instead of those four reference levels, eliminating the level generating circuit 11d and providing a pair of level detecting circuits. An embodiment having a pair of reference levels will be described in reference with FIGS. 4 and 5. It should be understood that the parts similar to those in Embodiment 1 shown by FIG. 1 are designated by the similar reference numerals and not described repeatedly. The manner in which the luminance data of the scene to be photographed is processed is similar to that in Embodiment as shot by FIGS. 9 through 22.

Figure 5:
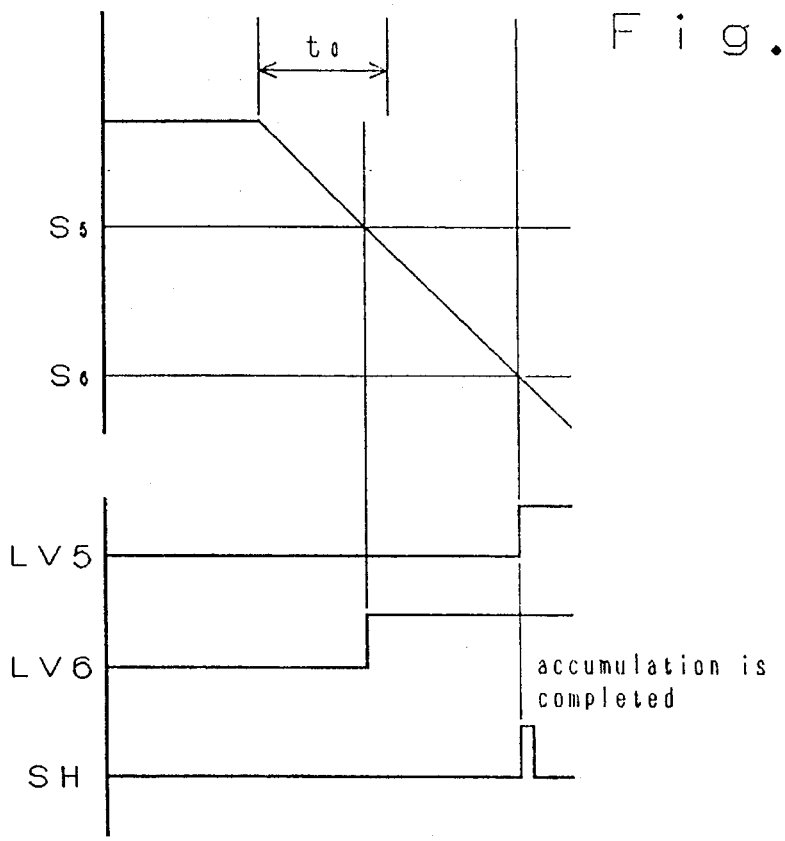
FIGS. 5(a) and 5(b) time charts showing the manner in which the third embodiment of line sensor control means operates until charge accumulation in the line sensor is completed.
Figure 5:
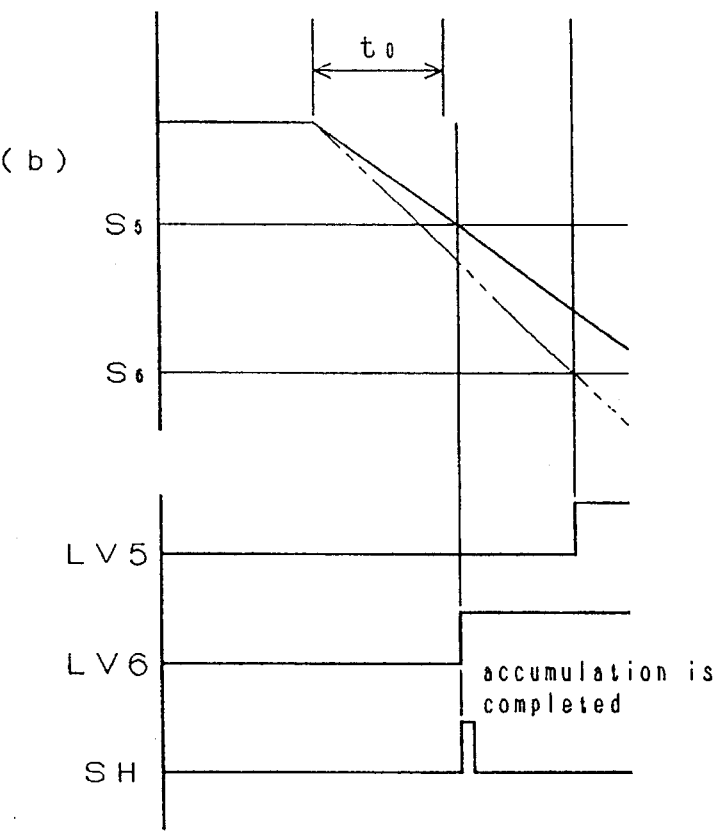

Output from the integrating circuit 11b is applied to a first level detecting circuit 11j and a second level detecting circuit 11k where the integral value is compared with a first detection level $S_5$ and a second detection level $S_6$, respectively. As shown by FIG. 5, these detection levels $S_5$, $S_6$ are adjusted to be in relationship of $S_5<S_6$ so that the drive control circuit 11a is applied with a detection signal $LV_5$ from the level detecting circuit 11j via detection signal line 11m when the integral value exceeds the detection level $S_5$ and with a detection signal $LV_6$ from the level detecting circuit 11k via detection signal line 11n. Upon reception of the detection signal $LV_5$, the drive control circuit 11a applies the amplifying circuit 11c with an amplification factor selecting signal for the first amplification factor $G_5$ and, upon reception of the detection signal $LV_6$, the drive control circuit 11a applies the amplifying circuit 11c with an amplification factor selecting signal for the second amplification factor $G_6$ so that the amplifying is 11c amplifies the output signal of the line sensor 8 at the selected amplification factor $G_5$ or $G_6$. These amplification factors $G_5$, $G_6$ are adjusted to be in relationship of $G_5>G_6$.

Referring to FIG. 5(a), if the integral value output from the integrating circuit 11b exceeds the detection level $S_5$ within the predetermined period $t_0$ and the detection signal $LV_5$ is output from the first level detecting circuit 11j, the detection signal $LV_6$ output from the second level detecting circuit 11k when the integral value subsequently exceeds the detection level $S_6$ causes the drive control circuit 11a to output the transfer signal SH. Referring to FIG. 5(b), If the integral value does not exceed the detection level $S_5$ within the predetermined period $t_0$, the detection signal $LV_5$ outpost when the detection level $S_5$ is exceeded after the predetermined period $t_0$ has elapsed causes the drive control circuit 11a to output the transfer signal SH. If the detection level $S_6$ is exceeded and the detection signal $LV_6$ is output within the predetermined period $t_0$, the signal $LV_6$ causes the drive control circuit 11a to output the transfer signal SH.

Upon reception of the transfer signal SH, the shift gate section 8b is opened, as in the previously mentioned Embodiments, so that the charge having been accumulated in the line sensor 8 to this time point, i.e., the luminance data of the scene to be photographed is transferred to the register 8c which applies, in turn, the amplifying circuit 11c with this luminance data. Then, the amplifying circuit 11c amplifies the output of the line sensor 8. The amplification factors $G_5$, $G_6$ used by the amplifying circuit 11c are associated with the detection levels $S_5$, $S_6$ compared with integral value at the moment when the transfer signal SH. More specifically, if the detection signal $LV_5$ output when the detection level $S_5$ is exceeded causes the drive control circuit 11a to output the transfer signal SH, the amplification factor $G_5$ is used by the amplifying circuit 11c and, if the detection signal $LV_6$ output when the detection level $S_6$ is exceeded causes the drive control circuit 11a to output the transfer signal SH, the amplification factor $G_6$ is used by the amplifying circuit 11c. The lower amplification factor $G_6$ is used in association with the higher second reference level $S_6$ and the higher amplification factor $G_5$ is used in association with the lower first reference level $S_5$ so that the video signal output from the line sensor 8 is amplified by the amplifying circuit 11c so as to have a practically constant signal level and applied to the converter 9 as in the previously mentioned Embodiments.

According to this Embodiment 3, the reference level generating circuit 11d adopted in Embodiment shown by FIG. 1 can be eliminated and the level detecting circuits having different thresholds. Accordingly, it is not required for the drive control circuit 11a to output the reference level selecting signal for alteration of the reference level and only to monitor elapsing of the predetermined period $t_0$ and the detection signal LV output after the predetermined period $t_0$ has elapsed.

According to Embodiments 2 and 3 as have been described above, there is provided the photosensitive monitoring means and an integral value of output from this photosensitive monitoring means is compared with a plurality or reference levels, respectively, as these reference levels are successively shifted from the minimum reference level toward the maximum reference level within the predetermined period. Charge accumulation is terminated in response to the detection signal for the maximum reference level output within the predetermined period or the first detection signal output after the predetermined period, so the detection signal for the higher reference level is output when the scene is of a relatively high luminance and the detection signal for the lower reference level is output when the scene is of a relatively low luminance, and charge accumulation is terminated with these detection signals. The video signal output from the line sensor is amplified at the lower amplification factor for the higher reference level and at the higher amplification factor for the lower reference level, i.e., the low amplification factor is used for the scene of relatively high luminance and the higher amplification factor is used for the scene of a relatively low luminance. Accordingly, appropriate association of the plural detection levels with the corresponding number of amplification factors allows the detection signals used for zero-cross detection to be amplified so as to have a practically constant signal level, independently of the scene's luminance. In this manner, the period elapsing before pick-up of the scene's luminance and charge accumulation by the line sensor is completed can be varied according to the luminance of the scene and thereby the range finding can be achieved within a conveniently short period.

Embodiment 4

Embodiment 4 will be described in reference with FIGS. 6 and 7. The manner of processing the picked up scene's luminance data is similar to that in Embodiment as shown by FIGS. 9 through 22.

Figure 6:
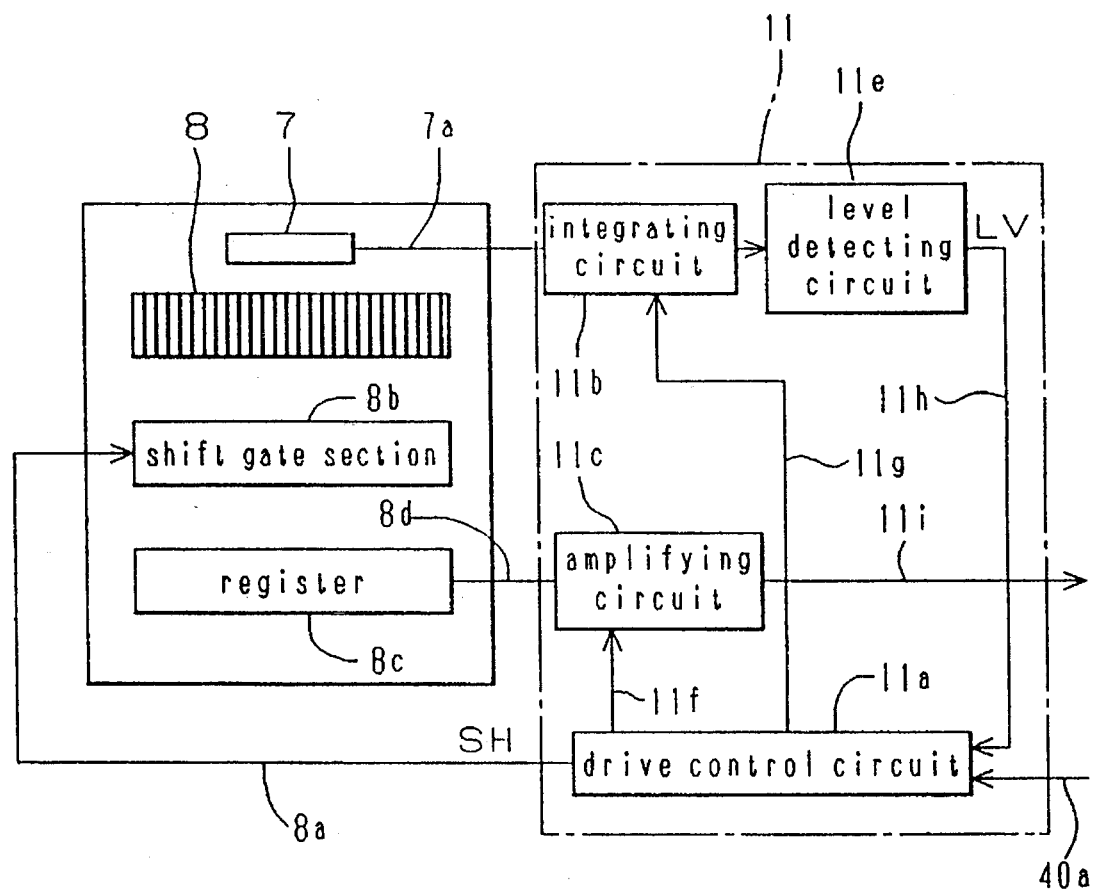
FIG. 6 is a block diagram illustrating fourth and fifth embodiments of line sensor control means used to control charge accumulation as well as transfer of accumulated charge occurring in the line sensor of the range finder for passive type autofocusing device constructed in accordance with the invention.

Referring to FIG. 6, the line sensor control means 11 comprises the drive control circuit 11a, the integrating circuit 11b, the amplifying circuit 11c, and the level detecting circuit the so that the drive control signal is applied from the control circuit 40 to the drive control circuit 11a. The sensor drive signal output from the drive control circuit 11a is applied via signal line 8a to the shift gate section 8b serving to change-over operation of the line sensor 8. More specifically, the shift gate section 8b is responsive to the sensor drive signal to initiate or terminate pick-up of the scene's luminance by the line sensor 8 and to be opened so the the luminance data of the scene accumulated in the line sensor 8 be transferred to the register 8c. Amplification factor selecting signal and integrating circuit reset signal both output from the drive control circuit 11a are applied via amplification factor selecting signal line 11f and reset signal line 11g, respectively, to the amplifying circuit 11c and the integrating circuit 11b, respectively. Detection signal LV output from the level detecting circuit 11e is applied via detection signal line 11h to the drive control circuit 11a. Output signal of the register 8c is applied via signal line 8d to the amplifying circuit 11c.

Figure 7:
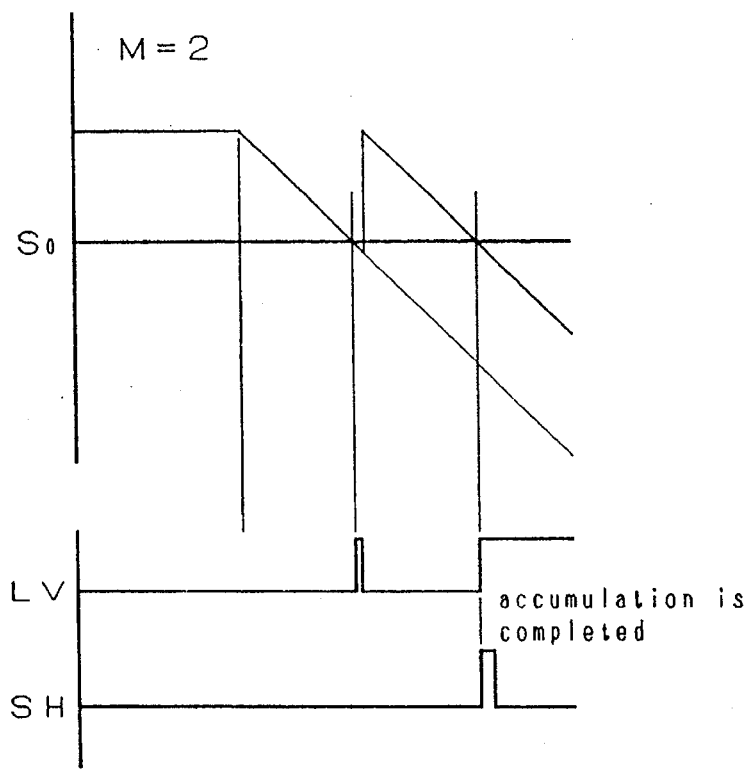
FIGS. 7(a) and 7(b) are time charts showing the manner in which the fourth embodiment of line sensor control means operates until charge accumulation in the line sensor is completed.
Figure 7:
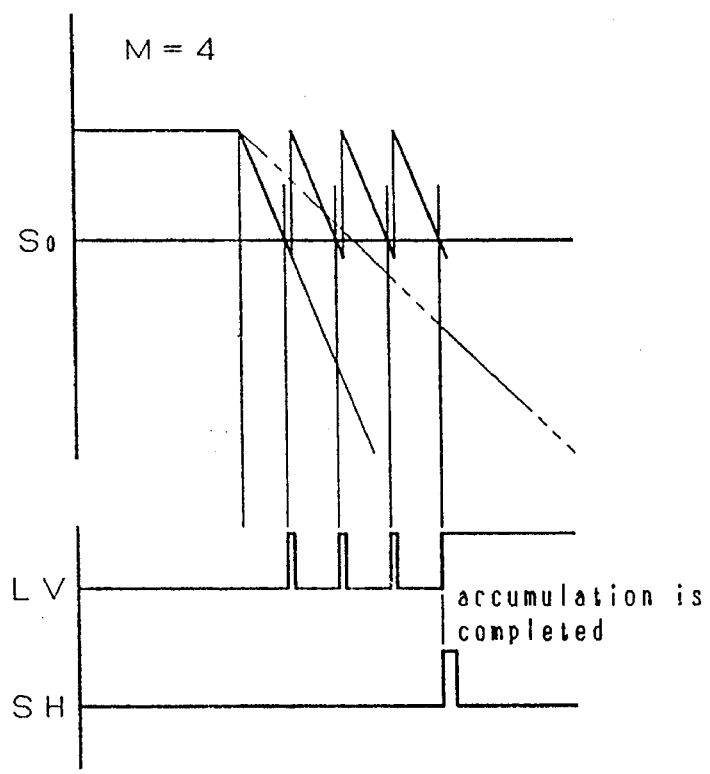

As will be apparent from FIG. 7, the detection signal LV is output from the level detection circuit 11e when the integral value provided from the integrating circuit 11b exceeds the detection level $S_0$ set for the level detecting circuit 11e. Upon reception of this detection signal LV, the drive control circuit 11a applies the integrating circuit 11b with the reset signal. The integrating circuit 11b is reset by this reset signal and begins again to integrate the output of the photosensitive monitoring means 7. A plurality of amplification factors G/M (G represents the maximum amplification factor and M represents positive integers) and the video signal output from the line sensor 8 is amplified at the one G/M selected from these plural amplification factors. When the amplification factor for the amplifying circuit 11b has previously been set to G/M, the drive control circuit 11a applies the integrating circuit 11b with the reset signal until the Mth detecting signal LV is applied to the drive control circuit 11a. Upon reception of this Mth detection signal LV, the drive control circuit 11a applies the line sensor 8 with the transfer signal SH, one of the sensor drive signals. Upon reception of this transfer signal SH, the shift gate section 8b is opened so that the scene's luminance data having been picked up by the line sensor 8 is transferred to the register 8c which applies, in turn, this luminance data to the amplifying circuit 11c. Setting of the amplification factor G/M for the amplifying circuit 11b is manually achieved by user operating a setting button or the like on the basis of factors such as a light intensity at the moment of photographing or automatically achieved according to a period elapsing before the integral value provided from the integrating circuit 11b exceeds the detection level of the level detecting is for the first time. If the period elapsing before the integral value exceeds the detection level for the first time is relatively short, the scene to be photographed has a correspondingly high luminance and a relatively low amplification factor is set. If the period for detection is relatively long, the scene is of a correspondingly low luminance and a relatively high amplification factor is set. Lower the amplification factor, longer the frequency of detection, i.e., denominator M in the above-mentioned G/M, thus increasing the number of times by which the detection level should be detected. Higher the amplification factor, smaller the denominator M, thus decreasing the number of times by which the detection level should be detected.

According to this Embodiment 4, upon depression of the release button of the camera (not shown), the range finding starter switch is turned ON and the range finding start signal is applied from the control circuit 40 to the drive control circuit 11a of the line sensor control means 11. Upon reception of this range finding start signal, the drive control circuit 11a applies the photosensitive monitoring means 7 and the line sensor 8 with the sensor drive signal so that the photosensitive monitoring means 7 and the line sensor 8 initiate pick-up of the scene's luminance and charge accumulation (step 1601). The drive control circuit 11a applies the amplifying circuit 11c with the amplification factor selecting signal depending on the present amplification factor G/M or, as will be described later, depending on the period elapsing before the first detection signal LV is applied to the drive control circuit 11a.

Output from the photosensitive monitoring means 7 reflecting the luminance of the scene picked up by this photosensitive monitoring means 7 is applied to the integrating circuit 11b and the integral value provided from this integrating circuit 11b is applied to the level detecting circuit 11e. As will be apparent from FIG. 7, an appropriate detection level $S_0$ is preset for this level detecting circuit level and the integrating value is compared with this detection level. $S_0$ so that, when the integral value exceeds the detection level $S_0$, the detection signal LV is output from the level detecting circuit 11e.

Upon reception of the detection signal LV, the drive control circuit 11a applies the integrating circuit 11b with the reset signal with which the integrating circuit 11b is reset and begins again to integrate the output of the photosensitive monitoring means 7. The number of times by which the integrating is 11b is reset is determined by the amplification factor G/M preset for the amplifying circuit 11c. If the amplification factor is set to G/2 (M=2), the integrating circuit 11c is reset once, as shown by FIG. 7(a) and, if the amplification factor is set to G/4 (M=4), the integrating circuit 11c is reset three times, as shown by FIG. 7(b). Upon reception of the second detection signal LV, if M=2, or of the fourth detection signal LV, if M=4, the drive control is 11a terminates charge accumulation by the line sensor 8 and the photosensitive monitoring means 7.

Upon reception of the detection signal LV from the level detecting circuit 11e, the drive control circuit 11e applies the transfer signal SH to the shift gate section 8b of the line sensor 8. With this transfer signal SH, the shift gate section 8b is opened and charge accumulation in the line sensor 8 is terminated, so the charge having been accumulated to this time point, i.e., the luminance data of the scene to be photographed is transferred to the register 8c which applies, in turn, the amplifying circuit 11c with the luminance distribution data of this scene. The amplifying circuit 11c amplifies the output signal of the line sensor 8 at the amplification factor G/M selected by instruction from the drive control circuit 11a. For the scene of a relatively low luminance, the detection frequency M is correspondingly smaller and the amplification factor is correspondingly higher. For the scene of a relatively high luminance, the detection frequency M is correspondingly larger and the amplification factor G/M is correspondingly lower. Accordingly, the video signal output from the line sensor 8 is amplified by the amplifying circuit 11c so as to have a practically constant signal level even for the scene's of different luminances.

According to this Embodiment 4, there is provided the photosensitive monitoring means and the integral value of output from this photosensitive monitoring means is compared with the detection level so that the integrating circuit may be reset by the detection signal output when the integral value exceeds the detection level and the frequency of such resetting may be associated with the amplification factor preset for the amplifying circuit. In this manner, the lower frequency of resetting may be associated with the correspondingly higher amplification factor for the scene of a relatively low luminance and the higher frequency of resetting may be associated with the correspondingly lower amplification factor for the scene of a relatively high luminance in order to obtain the zero-cross detection signal of a substantially constant signal level. Accordingly, the period elapsing before pick-up of the scene's luminance and charge accumulation by the line sensor is completed can be varied according to the luminance of the scene and thereby the range finding can be achieved within a conveniently short period.

Embodiment 5

Embodiment 5 will be described in reference with FIGS. 6 and 8. It should be understood that the line sensor control means is provided in the same construction as that shown by FIG. 6 and the picked up scene's luminance data is process in the same manner as in Embodiment 1 shown by FIGS. 9 through 22.

Figure 8:
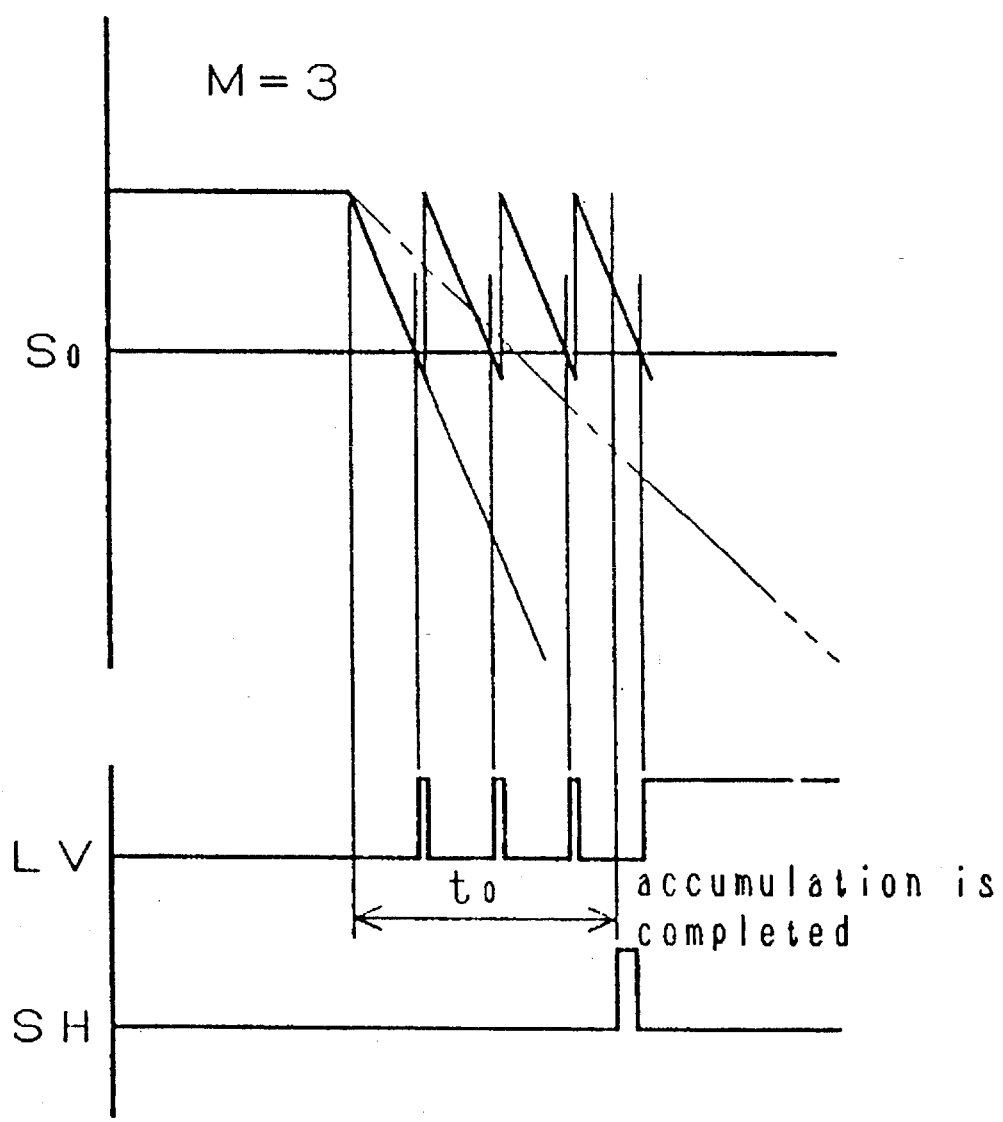
FIG. 8 is a time chart showing the manner in which the fifth embodiment of line sensor control means operates until charge accumulation in the line sensor is completed.

Referring to FIG. 8, the detection signal LV is output from the level detecting circuit 11e when the integral value provided from the integrating circuit 11b exceeds the detection level $S_0$ preset for this level detecting circuit 11e. Upon reception of this detection signal LV, the drive control circuit 11a applies the integrating circuit 11b with the reset signal with which the integrating circuit 11b is reset and begins again to integrate the output of the photosensitive monitoring means 7. A plurality of amplification factors can be set for the amplifying circuit 11c so that the video signal output from the line sensor 8 may be amplified at the one appropriately selected from the plurality of amplification factors, as will be described later.

Charge accumulation by the line sensor 8 and the photosensitive monitoring means 7 for the predetermined period $t_0$. Within this predetermined period $t_0$, the integrating circuit 11b is reset and repeatedly begins to perform integration every time the detection signal LV is output from the detecting circuit 11e so that every integral value may be compared with the detection level $S_0$. The drive control circuit 11a counts the number M of the detection signals LV (the number of circuit) output from the level detecting circuit 11e within the predetermined period $t_0$. The drive control circuit 11a selects and sets for the amplifying circuit 11c an amplification factor less than a product of the maximum amplification factor available for the amplifying circuit 11c and the reciprocal 1/M of the pulse number M, i.e., less than G/M (G represents the maximum amplification factor) but nearest to this G/M.

Referring to FIG. 8, the drive control circuit 11a is applies the line sensor 8 with the transfer signal SH, one of the sensor drive signals as the predetermined period to has elapsed. With this transfer signal SH, the shift gate section 8b is opened and the scene's luminance data picked up by the line sensor 8 to this the point is transferred to the register 8c which applies, in turn, the amplifying circuit 11c with this luminance data.

According to this Embodiment 5, upon depression of the release button of the camera (not shown), the range finding starter switch is turned ON and the range finding start signal is applied from the control circuit 40 to the drive control circuit 11a of the line sensor control means 11. Upon reception of this range finding start signal, the drive control circuit 11a applies the photosensitive monitoring means 7 and the line sensor 8 With the sensor drive signal so that the photosensitive monitoring means 7 and the line sensor 8 initiate pick-up of the scene's luminance and charge accumulation (step 1601). At the same time, the drive control is 11a begins to count the predetermined period $t_0$ for which the charge accumulation in the line sensor 8 is continued.

Output from the photosensitive monitoring means 7 reflecting the scene's luminance picked up by this photosensitive monitoring means 7 is applied to the integrating circuit 11b and the integral value provided from this integrating circuit 11b is applied to the level detecting circuit 11e. As will be apparent from FIG. 8, an appropriate detection level $S_0$ is preset for this level detecting circuit 11e and the integral value is compared with this detection level $S_0$ so that, when the integral value exceeds the detection level $S_0$, the detection signal LV is output from the level detecting circuit 11e.

Upon reception of the detection signal LV, the drive control circuit 11a applies the integrating circuit 11b with the reset signal with which the integrating circuit 11b is reset and begins again to integrate the output of the photosensitive monitoring means 7. The drive control circuit 11a counts the number of detection signals LV, i.e., the number M of circuit input for the predetermined period $t_0$. FIG. 8 illustrates a case in which three pulse are output (M=3) from the level, detecting circuit 11e within the predetermined period $t_0$. After the predetermined period $t_0$ has elapsed, the drive control circuit 11a applied the transfer signal SH to the shift gate section 8b of the line sensor 8, on one hand, and applies the amplification factor selecting signal to the amplifying is 11c, on the other hand. The amplification factor set for the amplifying circuit 11c corresponds to a product G/M of the available maximum amplification factor G and the reciprocal 1/M of the pulse number M. In the specific case illustrated by FIG. 8, the amplification factor set for the amplifying circuit 11c is G/3.

With the transfer signal SH from the drive control circuit 11a, the shift section 8b is opened and charge accumulation in the line sensor 8 is terminated, so the charge having been accumulated to this time point, i.e., the luminance data of the scene to be photographed is transferred to the register 8c which applies, in turn, the amplifying circuit 11c with this luminance distribution data. The amplifying circuit 11c amplifies the output signal of the line sensor 8 at the amplification factor selected by the instruction from the drive control circuit 11a. Larger the number M, of circuit output within the predetermined period $t_0$, shorter the period in which the integral value exceeds the detection level $S_0$, so the scene's luminance is correspondingly high and the reciprocal 1/M of the pulse number $M_2$ is correspondingly small. On the other hand, smaller the number $M_2$ of circuit, longer the period in which the integral value exceeds the detection level $S_0$, so the scene's luminance is correspondingly low and the reciprocal $1/M_2$ of the pulse number $M_2$ is correspondingly large. Accordingly, the video signal output from the line sensor 8 is amplified by the amplifying circuit 11c at the lower amplification factor $G/M_1$ for the scene of a relatively high luminance and at the higher amplification factor $G/M_2$ for the scene of a relatively low luminance so as to have a substantially constant signal level for the scenes of different luminances.

Accordingly to this Embodiment 5, there is provided the photosensitive monitoring means and the integral value of output from this photosensitive monitoring means is compared with the detection level within the predetermined period so that the integrating circuit may be reset by the detection signal output when the integral value exceeds the detection level and the amplification factor less than a product of the reciprocal number of times by which the detection level is repeatedly output within the predetermined period and the available maximum amplification factor but nearest to this product. In this manner, larger the number of times by which the detection level is repeatedly output, lower the amplification factor and, smaller the number of times by which the detection level is repeatedly output, higher the amplification factor. Specifically, larger the number of times by which the detection level is repeatedly output within the predetermined period, higher the scene's luminance, and the video signal output from the line sensor is amplified at the correspondingly lower amplification factor. On the other hand, smaller the number of times by which the detection level in repeatedly output within the predetermined period, lower the scene's luminance, and the video signal is amplified at the correspondingly higher amplification factor. Consequently, the video signal can be amplified so as to provide the zero-cross detection signal having a substantially constant signal level. Additionally, charge accumulation is terminated within the predetermined period independently of the scene's luminance and therefore the range finding can be achieved within a conveniently short period.

In Embodiments 1 through 5 having been described hereinabove, the data stored in the zero-cross memory circuits to detect a coincidence comprises polarity data and location data. For example, if the secondary difference signal DIFF is divided into four portions and the location data is stored at the addresses of the respective portions, a memory capacity should have four bits for every polarity and one bit for positive and negative polarities. If the data is stored separately as the polarity data and the location data as in Embodiments of the invention, four bit memory capacity will be sufficient for the storage, i.e., 2 bits for the location code and one bit for the polarity data will meet the requirement.

While the respective Embodiments have been described as using the single line sensor 8 divided into three sections, it is also possible to provide separate three line sensors of left side line sensor, right side line sensor and central line sensor so that the line sensor control means, the A/D converter 9, the secondary difference computing circuit 12, the zero-cross detecting circuit 13 and the other components are associated with each of those three line sensors. While the invention has been described wherein the luminance distribution data A/D converted by the A/D converter 9 is interpolated, the analog data may be directly interpolated or the secondary difference may be computed without interpolation to detect a zero-cross.

The range finder for passive type autofocusing device according to the invention allows scenes having a wide range of luminances to be range found and a photographic camera equipped with a range finder which is versatile and substantially free from affection of the scene's condition.

In addition, the invention permits the range data to be obtained with a high precision, since the invention relies on comparison of the zero-cross data derived from the respective secondary differences but not on comparison of the luminance distribution patterns formed by the scene to be photographed on the line sensor or line sensors.

What is claimed is:

1. A range finder for a passive type autofocusing device, the range finder comprising:

three photosensors including a line sensor and adapted to pick up a luminance distribution of a scene to be photographed;

a secondary difference computing circuit serving to compute secondary difference of outputs from said three photosensors;

a zero-cross detecting circuit adapted to detect a zero-cross point of an output from said secondary difference computing circuit;

zero-cross memory circuits adapted to store, in association with said three photosensors, respectively, zero-cross behavior obtained from said zero-cross detecting circuit;

a coincidence detecting circuit adapted to compare said zero-cross behavior signals stored in said zero-cross memory circuits;

photosensitive monitoring means for sensing an average luminance of the scene to be photographed and outputting a luminance signal representative of the luminance of the scene;

an integrating circuit coupled to said photosensitive monitoring means for receiving said luminance signal from said photosensitive monitoring means and for integrating said luminance signal to provide an integrated luminance signal;

a level detecting circuit coupled to said integrating circuit for detecting the level of said integrated luminance signal provided by said integrating circuit and for outputting a detection signal when the detected level of said integrated luminance signal exceeds a reference level; and an amplifying circuit coupled to said level detecting circuit and to said line sensor for amplifying a video signal output from said line sensor at a selected one of a plurality of amplification factors in response to said detection signal output from said level detecting circuit; and a drive control circuit coupled to said amplifying circuit for driving said amplifying circuit at an appropriate amplification factor selected from the plurality of amplification factors, wherein, prior to causing a video signal to be output from said line sensor and amplified, said drive control circuit resets said integration circuit by terminating integration of said integrated luminance signal each time said integrated luminance signal exceeds a first reference level within a predetermined time period, and wherein one of said three photosensors is selected as a reference photosensor and said zero-cross behavior signals obtained from the other two photosensors are successively shifted relative to said zero-cross behavior signal obtained from said reference photosensor until a coincidence of said zero-cross behavior signals is detected by said coincidence detecting circuit and a range to the scene is computed from a total amount of such shifting.

2. A range finder for a passive type autofocusing device, the range finder comprising:

three photosensors including a line sensor and adapted to pick up a luminance distribution of a scene to be photographed;

a secondary difference computing circuit serving to compute secondary difference of outputs from said three photosensors;

a zero-cross detecting circuit adapted to detect a zero-cross point of an output from said secondary difference computing circuit;

zero-cross memory circuits adapted to store, in association with said three photosensors, respectively, zero-cross behavior signals obtained from said zero-cross detecting circuit;

a coincidence detecting circuit adapted to compare said zero-cross behavior signals stored in said zero-cross memory circuits;

photosensitive monitoring means for sensing an average luminance of the scene to be photographed and outputting a luminance signal representative of the luminance of the scene;

an integrating circuit coupled to said photosensitive monitoring means for receiving said luminance signal from said photosensitive monitoring means and for integrating said luminance signal to provide an integrated luminance signal;

a level detecting circuit coupled to said integrating circuit for detecting a time elapsing before the level of said integrated luminance signal reaches a predetermined reference level; and an amplifying circuit coupled to said line sensor for amplifying a video signal output from said line sensor at a selected one of a plurality of amplification factors that is selected based upon the number of times the level of said integrated luminance signal reaches the predetermined reference level within a predetermined time period;

wherein one of said three photosensors is selected as a reference photosensor and said zero-cross behavior signals obtained from the other two photosensors are successively shifted relative to said zero-cross behavior signal obtained from said reference photosensor until a coincidence of said zero-cross behavior signals is detected by said coincidence detecting circuit and a range to the scene is computed from a total amount of such shifting.

3. A range finder for a passive type autofocusing device, the range finder comprising:

three photosensors including a line sensor and adapted to pick up a luminance distribution of a scene to be photographed;

a secondary difference computing circuit serving to compute secondary difference of outputs from said three photosensors;

a zero-cross detecting circuit adapted to detect a zero-cross point of an output from said secondary difference computing circuit;

zero-cross memory circuits adapted to store, in association with said three photosensors, respectively, zero-cross behavior signals obtained from said zero-cross detecting circuit;

a coincidence detecting circuit adapted to compare said zero-cross behavior signals stored in said zero-cross memory circuits;

photosensitive monitoring means for sensing an average luminance of the scene to be photographed and outputting a luminance signal representative of the luminance of the scene;

an integrating circuit coupled to said photosensitive monitoring means for receiving said luminance signal from said photosensitive monitoring means and for integrating said luminance signal to provide an integrated luminance signal;

a level detecting circuit coupled to said integrating circuit for detecting the level of said integrated luminance signal and comparing the level of said integrated luminance signal with a selected detection level corresponding to one of a first reference level and a second reference level lower than the first reference level and for outputting a completion signal indicating completion of charge accumulation in said line sensor when the level of said integrated luminance signal provided from said integrating circuit reaches the selected detection level;

an amplifying circuit coupled to said line sensor, said amplifying circuit having a first amplification factor and a second amplification factor higher than the first amplification factor and adapted to amplify the video signal output from said line sensor selectively at one of these two amplification factors; and a drive control circuit coupled to control said level detecting circuit and said amplifying circuit by selecting one of a combination of first reference level-first amplification factor and a combination of a second reference level-second amplification factor;

wherein said drive control circuit causes charge accumulation by said line sensor and integration by said integrating circuit first using the first reference level as the detection level for a predetermined time period and, upon reception of said completion signal from said level detecting circuit within said predetermined time period, said drive control circuit terminates charge accumulation, and causes said line sensor to output the video signal, followed by causing this video signal to be amplified at the corresponding first amplification factor;

wherein if no completion signal is output from said level detecting circuit with said predetermined time period, said drive control circuit terminates charge accumulation by said line sensor and integration by said integrating circuit, then changes the detection level from the first reference level to the second reference level to cause charge accumulation and integration to be reinitialized and start again and, upon reception of the completion as this detection level is reached, said drive control circuit terminates charge accumulation and causes the line sensor to output the video signal, followed by causing this video signal to be amplified at the corresponding second amplification factor; and wherein one of said three photosensors is selected as a reference photosensor and said zero-cross behavior signals obtained from the other two photosensors are successively shifted relative to said zero-cross behavior signal obtained from said reference photosensor until a coincidence of said zero-cross behavior signals is detected by said coincidence detecting circuit and a range to the scene is computed from a total amount of such shifting.

4. A range finder for a passive type autofocusing device, the range finder comprising:

three photosensors including a line sensor and adapted to pick up a luminance distribution of a scene to be photographed;

a secondary difference computing circuit serving to compute secondary difference of outputs from said three photosensors;

a zero-cross detecting circuit adapted to detect a zero-cross point of art output from said secondary difference computing circuit;

zero-cross memory circuits adapted to store, in association with said three photosensors, respectively, zero-cross behavior signals obtained from said zero-cross detecting circuit;

a coincidence detecting circuit adapted to compare said zero-cross behavior signals stored in said zero-cross memory circuits;

photosensitive monitoring means for sensing an average luminance of the scene to be photographed and outputting a luminance signal representative of the luminance of the scene;

an integrating circuit coupled to said photosensitive monitoring means for receiving said luminance signal from said photosensitive monitoring means and for integrating said luminance signal to provide an integrated luminance signal;

a level detecting circuit coupled to said integrating circuit for detecting the level of said integrated luminance signal and comparing the level of said integrated luminance signal with a selected detection level and for outputting a detection signal when the level of said integrated luminance signal reaches the selected detection level;

an amplifying circuit coupled to said line sensor for amplifying the video signal output from said line sensor selectively at a plurality of amplification factors;

a drive control circuit coupled to said amplifying circuit for driving said amplifying circuit at an appropriate amplification factor selected from the plurality of amplification factors; and a reference level generating circuit for supplying said level detecting circuit with a selected one of a plurality of detection levels upon reception of an output signal from said drive control circuit, wherein there are provided a same number of detection levels as the number of amplification factors and the detection levels are associated with the amplification factors so that the lower detection levels are associated with the correspondingly higher amplification factors and the higher detection levels are associated with the correspondingly lower amplification factors;

wherein, upon each reception of the detection signal output from said level detecting circuit within a predetermined time period, said drive control circuit outputs said output signal to said reference level generating circuit causing said reference level generating circuit to supply said level detecting circuit with the detection level successively selected in the order from the lowest to the highest;

wherein, upon reception of the detection signal for the highest detection level output from said level detecting circuit within a predetermined time period or the first detection signal output therefrom after the predetermined time period has elapsed, said drive control circuit terminates charge accumulation in said line sensor, causes said line sensor to output a video signal and causes said amplifying circuit to amplify the video signal at the amplification factor corresponding to the detection level at the moment of completion of charge accumulation; and wherein one of said three photosensors is selected as a reference photosensor and said zero-cross behavior signals obtained from the other two photosensors are successively shifted relative to said zero-cross behavior signal obtained from said reference photosensor until a coincidence of said zero-cross behavior signals is detected by said coincidence detecting circuit and a range to the scene is computed from a total amount of such shifting.

5. A range finder for a passive type autofocusing device, the range finder comprising:

three photosensors including a line sensor and adapted to pick up a luminance distribution of a scene to be photographed;

a secondary difference computing circuit serving to compute secondary difference of outputs from said three photosensors;

a zero-cross detecting circuit adapted to detect a zero-cross point of an output from said secondary difference computing circuit;

zero-cross memory circuits adapted to store, in association with said three photosensors, respectively, zero-cross behavior signals obtained from said zero-cross detecting circuit;

a coincidence detecting circuit adapted to compare said zero-cross behavior signals stored in said zero-cross memory circuits;

photosensitive monitoring means for sensing an average luminance of the scene to be photographed and outputting a luminance signal representative of the luminance of the scene;

an integrating circuit coupled to said photosensitive monitoring means for receiving said luminance signal from said photosensitive monitoring means and for integrating said luminance signal to provide an integrated luminance signal;

a plurality of level detecting circuits coupled to said integrating circuit for detecting the level of said integrated luminance signal and comparing the level of said integrated luminance signal with a different detection level and for outputting a detection signal when the level of said integrated luminance signal reaches the respective detection levels;

an amplifying circuit coupled to said line sensor for amplifying the video signal output from said line sensor selectively at a plurality of amplification factors; and a drive control circuit coupled to said amplifying circuit for driving said amplifying circuit at an appropriate amplification factor selected from the plurality of amplification factors;

wherein the detection levels of the respective level detecting circuits are associated with the plurality of amplification factors so that the lower detection levels are associated with the correspondingly higher amplification factors or the higher detection levels are associated with the correspondingly lower amplification factors;

wherein, when the integrated luminance signal exceeds the lowest detection level within a predetermined time period and the detection signal output from the corresponding level detecting circuit for the highest detection level is received or when the integrated luminance signal does not exceed the lowest detection level within a predetermined time period and the detection signal output from the corresponding level detecting circuit for the lowest detection level is received, said drive control circuit terminates the charge accumulation in said line sensor, causes said line sensor to output a video signal and causes said amplifying circuit to amplify the video signal at the amplification factor corresponding to the detection level at the moment of completion of charge accumulation; and wherein one of said three photosensors is selected as a reference photosensor and said zero-cross behavior signals obtained from the other two photosensors are successively shifted relative to said zero-cross behavior signal obtained from said reference photosensor until a coincidence of said zero-cross behavior signals is detected by said coincidence detecting circuit and a range to the scene is computed from a total amount of such shifting.

6. A range finder for a passive type autofocusing device, the range finder comprising:

three photosensors including a line sensor and adapted to pick up a luminance distribution of a scene to be photographed;

a secondary difference computing circuit serving to compute secondary difference of outputs from said three photosensors;

a zero-cross detecting circuit adapted to detect a zero-cross point of an output from said secondary difference computing circuit;

zero-cross memory circuits adapted to store, in association with said three photosensors, respectively, zero-cross behavior signals obtained from said zero-cross detecting circuit;

a coincidence detecting circuit adapted to compare said zero-cross behavior signals stored in said zero-cross memory circuits;

photosensitive monitoring means for sensing an average luminance of the scene to be photographed and outputting a luminance signal representative of the luminance of the scene;

an integrating circuit coupled to said photosensitive monitoring means for receiving said luminance signal from said photosensitive monitoring means and for integrating said luminance signal to provide an integrated luminance signal;

a level detecting circuit coupled to said integrating circuit for detecting the level of said integrated luminance signal and comparing the level of said integrated luminance signal with a preset detection level and for outputting a detection signal when the level of said integrated luminance signal provided from said integrating circuit reaches the preset detection level;

an amplifying circuit coupled to said line sensor for selectively amplifying a video signal output from said line sensor at a selected one of a plurality of amplification factors G/M (G represents the highest amplification factor and M represents positive integers); and a drive control circuit coupled to said level detecting circuit and said amplifying circuit for controlling charge accumulation in said line sensor, and for resetting said integrating circuit and setting of the amplification factor G/M for said amplifying circuit;

wherein said drive control circuit resets the integrating circuit each time a detection signal is received from said level detecting circuit until the Mth detection signal output from the level detecting circuit is received, said drive control circuit terminates charge accumulation in said line sensor upon reception of the Mth detection signal and triggers amplification at the preset amplification factor; and wherein one of said three photosensors is selected as a reference photosensor and said zero-cross behavior signals obtained from the other two photosensors are successively shifted relative to said zero-cross behavior signal obtained from said reference photosensor until a coincidence of said zero-cross behavior signals is detected by said coincidence detecting circuit and a range to the scene is computed from a total amount of such shifting.

7. A range finder for a passive type autofocusing device, the range finder comprising:

three photosensors including a line sensor and adapted to pick up a luminance distribution of a scene to be photographed;

a secondary difference computing circuit serving to compute secondary difference of outputs from said three photosensors;

a zero-cross detecting circuit adapted to detect a zero-cross point of an output from said secondary difference computing circuit;

zero-cross memory circuits adapted to store, in association with said three photosensors, respectively, zero-cross behavior signals obtained from said zero-cross detecting circuit;

a coincidence detecting circuit adapted to compare said zero-cross behavior signals stored in said zero-cross memory circuits;

photosensitive monitoring means for sensing an average luminance of the scene to be photographed and outputting a luminance signal representative of the luminance of the scene;

an integrating circuit coupled to said photosensitive monitoring means for receiving said luminance signal from said photosensitive monitoring means and for integrating said luminance signal to provide an integrated luminance signal;

a level detecting circuit coupled to said integrating circuit for detecting the level of said integrated luminance signal and comparing the level of said integrated luminance signal with a preset detection level and for outputting a detection signal when the level of said integrated luminance signal provided from said integrating circuit reaches the preset detection level;

an amplifying circuit coupled to said line sensor for amplifying a video signal output from said line sensor at an appropriate one of a plurality of amplification factors; and a drive control circuit coupled to said level detecting circuit and said amplifying circuit for controlling charge accumulation in said line sensor, and for resetting said integrating circuit and setting of the amplification factor for said amplifying circuit;

wherein charge accumulation occurs in said line sensor for a predetermined period and, if the number of detection signals output from said level detecting circuit within this predetermined period is M, an amplification factor which is lower than 1/M of the highest amplification factor in said amplifying circuit but nearest to 1/M is set for said amplifying circuit so that the output signal of said line sensor is amplified at this amplification factor; and wherein one of said three photosensors is selected as a reference photosensor and said zero-cross behavior signals obtained from the other two photosensors are successively shifted relative to said zero-cross behavior signal obtained from said reference photosensor until a coincidence of said zero-cross behavior signals is detected said coincidence detecting circuit and a range to the scene is computed from a total amount of such shifting.

8. A range finder for a passive type autofocusing device, the range finder comprising:

three photosensors including a line sensor and adapted to pick up a luminance distribution of a scene to be photographed;

a secondary difference computing circuit serving to compute secondary difference of outputs from said three photosensors;

a zero-cross detecting circuit adapted to detect a zero-cross point of an output from said secondary difference computing circuit;

zero-cross memory circuits adapted to store, in association with said three photosensors, respectively, zero-cross behavior signals obtained from said zero-cross detecting circuit;

a coincidence detecting circuit adapted to compare said zero-cross behavior signals stored in said zero-cross memory circuits;

photosensitive monitoring means for sensing luminance of the scene to be photographed and outputting a luminance signal representative of the luminance of the scene;

an integrating circuit coupled to said photosensitive monitoring means for receiving said luminance signal from said photosensitive monitoring means and for integrating said luminance signal to provide an integrated luminance signal;

a level detecting circuit coupled to said integrating circuit for detecting the level of said integrated luminance signal provided by said integrating circuit and for outputting a detection signal when the detected level of said integrated luminance signal exceeds a reference level;

an amplifying circuit coupled to said level detecting circuit and to said line sensor for amplifying a video signal output from said line sensor at a selected one of a plurality of amplification factors in response to said detection signal output from said level detecting circuit; and a drive control circuit coupled to said amplifying circuit for driving said amplifying circuit at an appropriate amplification factor selected from the plurality of amplification factors, wherein, prior to causing a video signal to be output from said line sensor and amplified, said drive control circuit resets said line sensor and said integration circuit by terminating charge accumulation in said line sensor and terminating integration of said integrated luminance signal when said integrated luminance signal does not exceed a first reference level within a predetermined time period, and wherein one of said three photosensors is selected as a reference photosensor and said zero-cross behavior signals obtained from the others of said photosensors are successively shifted relative to said zero-cross behavior signal obtained from said reference photosensor until a coincidence of said zero-cross behavior signals is detected by said coincidence detecting circuit and a range to the scene is computed from a total amount of such shifting.

9. A line sensor control circuit for a range finder used in a passive type autofocusing device, where the range finder includes at least one photosensor, said line sensor control circuit comprising: photosensitive monitoring means for sensing luminance of the scene to be photographed and outputting a luminance signal representative of the luminance of the scene; and an integrating circuit coupled to said photosensitive monitoring means for receiving said luminance signal from said photosensitive monitoring means and for integrating said luminance signal to provide an integrated luminance signal;

level detecting means coupled to said integrating circuit for detecting the level of said integrated luminance signal provided by said integrating circuit and for outputting a detection signal when the detected level of said integrated luminance signal exceeds a reference level;

amplifying means coupled to said level detecting circuit and to the photosensor for amplifying a video signal output from the photosensor at a selected one of a plurality of amplification factors in response to said detection signal output from said level detecting means; and a drive control circuit coupled to said amplifying circuit for driving said amplifying circuit at an appropriate amplification factor selected from the plurality of amplification factors, wherein, prior to causing a video signal to be output from said photosensor and amplified, said drive control circuit resets said integration circuit by terminating integration of said integrated luminance signal when either (1) said integrated luminance signal does not exceed a first reference level within a predetermined time period or (2) each time said integrated luminance signal exceeds a first reference level within a predetermined time period.

* * * * *

UNITED STATES PATENT AND TRADEMARK OFFICE
CERTIFICATE OF CORRECTION

PATENT NO.    : 5,565,954
DATED         : October 15, 1996
INVENTOR      : Minoru Ishiguro It is certified that error appears in the above-identified patent and that said Letters Patent is hereby corrected as shown below:

Column 2, line 60;
　　　"luminarice" should be --luminance--.

Column 2, line 63;
　　　"used" should be --use--.

Column 3, line 11;
　　　"luminarice" should be --luminance

Column 3, line 22;
　　　"luminarice" should be --lumin ance

Column 8, line 32;
　　　"the" should be --that--.

Column 8, line 40;
　　　"or" should be --of--.

Column 9, line 39;
　　　"circuit" should be --pulses--.

Column 11, line 36;
　　　After "20a," insert --30a--.

Column 12, line 32;
　　　"that" should be --than--.

UNITED STATES PATENT AND TRADEMARK OFFICE
CERTIFICATE OF CORRECTION

PATENT NO.    : 5,565,954
DATED         : October 15, 1996
INVENTOR      : Minoru Ishiguro It is certified that error appears in the above-identified patent and that said Letters Patent is hereby corrected as shown below:

Column 13, line 37;
    "gatt" should be --gate--.

Column 15, line 36;
    "bedescribed" should be --be described--.

Column 15, line 62;
    After "integrating" delete "is" and insert therefore --circuit--.

Column 15, line 65;
    Delete "is" and substitute therefore --circuit--.

Column 18, line 19;
    "1004" should be --1904--.

Column 18, line 48;
    Delete "is" and substitute therefore --circuit--.

Column 19, line 17;
    "or" should be --of--.

Column 19, line 46;
    "is" should be --circuit--.

Column 20, line 40;
    "is" should be --circuit--.

UNITED STATES PATENT AND TRADEMARK OFFICE
CERTIFICATE OF CORRECTION

PATENT NO. : 5,565,954
DATED : October 15, 1996
INVENTOR : Minoru Ishiguro

It is certified that error appears in the above-identified patent and that said Letters Patent is hereby corrected as shown below:

Column 20, line 64;
    "or" should be --of--.

Column 21, line 42;
    "$S_1$" should be --$S_4$--.

Column 23, line 46;
    "lid" should be --11d--.

Column 23, line 53;
    "shot" should be --shown--.

Column 24, line 5;
    "is" should be --circuit--.

Column 24, line 18;
    "outpost" should be --output--.

Column 25, line 34;
    "the" should be --11e--.

Column 25, line 42;
    "the the" should be --that the--.

Column 26, line 16;
    "is" should be --circuit--.

UNITED STATES PATENT AND TRADEMARK OFFICE
CERTIFICATE OF CORRECTION

PATENT NO. : 5,565,954
DATED : October 15, 1996
INVENTOR : Minoru Ishiguro

It is certified that error appears in the above-identified patent and that said Letters Patent is hereby corrected as shown below:

Column 26, line 53;
    "level" should be --11e--.

Column 26, line 54;
    "level." should be --level--.

Column 26, line 62;
    "is" should be --circuit--.

Column 27, line 19;
    After "factor" insert --G/M--.

Column 28, line 11;
    "circuit" should be --pulses--.

Column 28, line 24;
    "this the" should be --this time--.

Column 28, line 63;
    "is" should be --circuit--.

Column 29, line 5;
    "shift section" should be --shift gate section--.

Column 29, line 18;
    "circuit" should be --pulses--.

UNITED STATES PATENT AND TRADEMARK OFFICE
CERTIFICATE OF CORRECTION

PATENT NO. : 5,565,954
DATED : October 15, 1996
INVENTOR : Minoru Ishiguro

It is certified that error appears in the above-identified patent and that said Letters Patent is hereby corrected as shown below:

Column 29, line 49;
    "in" should be --is--.

Column 30, claim 1, line 43;
    After "behavior" insert --signals--.

Column 33, claim 4, line 30;
    "art" should be --an--.

Abstract, line 20;
    "luminaries" should be --luminances--.

Abstract, line 22;
    "luminaries" should be --luminances--.

Signed and Sealed this

Twenty-ninth Day of April, 1997

Attest:

BRUCE LEHMAN

Attesting Officer      Commissioner of Patents and Trademarks